(12) United States Patent
Zeng et al.

(10) Patent No.: US 11,017,178 B2
(45) Date of Patent: *May 25, 2021

(54) METHODS, DEVICES, AND SYSTEMS FOR CONSTRUCTING INTELLIGENT KNOWLEDGE BASE

(71) Applicant: SHANGHAI XIAOI ROBOT TECHNOLOGY CO., LTD., Shanghai (CN)

(72) Inventors: Yongmei Zeng, Shanghai (CN); Bo Li, Shanghai (CN); Gongzhi Yao, Shanghai (CN); Pinpin Zhu, Shanghai (CN)

(73) Assignee: Shanghai Xiaoi Robot Technology Co., Ltd., Shanghai (CN)

( * ) Notice: Subject to any disclaimer, the term of this patent is extended or adjusted under 35 U.S.C. 154(b) by 29 days.

This patent is subject to a terminal disclaimer.

(21) Appl. No.: 16/504,550

(22) Filed: Jul. 8, 2019

(65) Prior Publication Data
US 2019/0332672 A1 Oct. 31, 2019

Related U.S. Application Data

(63) Continuation of application No. 15/390,118, filed on Dec. 23, 2016, now Pat. No. 10,394,956.

(30) Foreign Application Priority Data

Dec. 31, 2015 (CN) .......................... 201511028179.2
Dec. 31, 2015 (CN) .......................... 201511030319.X
(Continued)

(51) Int. Cl.
*G06F 7/00* (2006.01)
*G06F 40/30* (2020.01)
(Continued)

(52) U.S. Cl.
CPC .......... *G06F 40/30* (2020.01); *G06F 16/3344* (2019.01); *G06N 5/04* (2013.01)

(58) Field of Classification Search
CPC .... G06F 40/30; G06F 16/3344; G06F 16/335; G06F 16/367; G06F 16/345; G06F 16/35; G06F 16/36; G06F 40/40; G06N 5/04
See application file for complete search history.

(56) References Cited

U.S. PATENT DOCUMENTS 6,401,061 B1 6/2002 Zieman
8,117,178 B2 * 2/2012 Qi ....................... G06F 16/3344
707/706

(Continued)

FOREIGN PATENT DOCUMENTS

CN 103377225 A 10/2013
CN 104615724 A 5/2015
(Continued)

*Primary Examiner* — Azam M Cheema
(74) *Attorney, Agent, or Firm* — Morgan, Lewis & Bockius LLP

(57) ABSTRACT

A device for constructing an intelligent knowledge base, comprising an abstract semantic expression obtaining unit to obtain a plurality of abstract semantic expressions from an abstract semantic database, wherein each of the plurality of abstract semantic expressions comprises a semantic-lacking element; a receiving unit to receive an initial request message; an abstract semantic recommending module to obtain abstract semantic expressions corresponding to the initial request message by performing an abstract semantic recommending process on the initial request message based on the plurality of abstract semantic expressions; a filling unit to extract from the initial request message an element corresponding to a semantic-lacking element of the obtained abstract semantic expressions, and to fill the extracted element into the semantic-lacking element to obtain specific semantic expressions corresponding to the initial request (Continued)

message; and a storing unit to store the initial request message and the specific semantic expressions into the intelligent knowledge base.

18 Claims, 14 Drawing Sheets

(30) Foreign Application Priority Data

Dec. 31, 2015 (CN) .......................... 201511030332.5
Dec. 31, 2015 (CN) .......................... 201511030353.7

(51) Int. Cl.
*G06F 16/33* (2019.01)
*G06N 5/04* (2006.01)

(56) References Cited

U.S. PATENT DOCUMENTS

| | | | |
|---|---|---|---|
| 10,394,956 B2* | 8/2019 | Zeng | G06F 16/3344 |
| 2008/0243777 A1 | 10/2008 | Stewart et al. | |
| 2012/0296637 A1 | 11/2012 | Smiley et al. | |
| 2017/0177715 A1* | 6/2017 | Chang | G06F 40/186 |

FOREIGN PATENT DOCUMENTS

| CN | 101876981 B | 9/2015 |
|---|---|---|
| CN | 104991965 A | 10/2015 |

* cited by examiner

METHODS, DEVICES, AND SYSTEMS FOR CONSTRUCTING INTELLIGENT KNOWLEDGE BASE

CROSS-REFERENCE TO RELATED APPLICATION

This application is a continuation of U.S. patent application Ser. No. 15/390,118, which claims the priority and benefit of Chinese Patent Application No. 201511028179.2, filed on Dec. 31, 2015, Chinese Patent Application No. 201511030319.X filed on Dec. 31, 2015, Chinese Patent Application No. 201511030332.5 filed on Dec. 31, 2015, and Chinese Patent Application No. 201511030353.7 filed on Dec. 31, 2015. U.S. patent application Ser. No. 15/390,118 and the above four Chinese applications are incorporated herein in their entirety by reference.

TECHNICAL FIELD

The present disclosure relates to a data processing technology field, and more particularly, to methods, devices, and systems for constructing an intelligent knowledge base such as a question-answer knowledge base based on semantic similarity calculation and/or abstract semantic recommendation.

BACKGROUND

Knowledge base is also known as intelligent subject domain database or artificial intelligence database. The subject domain database is a well-structured, easy-to-operate, easy-to-use and fully organized knowledge cluster. In order to answer questions in one (or some) field, the subject domain database is constructed as a collection of relevant knowledge pieces which are stored, organized, managed, and used in computer storages in one (or some) knowledge expression form. The knowledge pieces may include theoretical knowledge and factual data related to this field, and heuristic knowledge obtained by expert experiences, such as definitions in this field, theorems, operation rules, common knowledge, etc.

The subject domain database has been widely used. A typical application of the subject domain database is an intelligent question-answer knowledge base or an automatic question-answer knowledge base. The automatic question-answer knowledge base stores a number of preset questions and a number of answers corresponding to the preset questions. When a user asks a question (or an initial request message), the automatic question-answer knowledge base tries to find a match among the preset questions for the user question. If the match is found, the automatic question-answer knowledge base feedbacks to the user an answer corresponding to the matched preset question. Therefore, the user may have the answer for his/her user question.

However, questions asked by different users have different viewpoints and different expressions. In order to improve accuracy of the question-answer knowledge base, a lot of questions have to be manually input into a question database. This process is time and energy consuming and low efficiency. Also, each question is paired with an answer and thus the knowledge base needs a huge amount of the storage space to store paired questions-answers. In addition, due to the limitation of the storage space and/or the knowledge volume, the knowledge base may not store enough paired questions-answers and may not provide an answer to a user's question.

Thus, there is a need to develop devices, systems, and methods that efficiently storing knowledge and construct an intelligent knowledge base, dynamically generate answers to user queries, and overcome the limitations of conventional question-answer knowledge base. Devices, systems, and methods disclosed below address the above described needs.

SUMMARY

The present disclosure includes an exemplary device for constructing an intelligent knowledge base. An exemplary device in accordance with the present disclosure comprises: an abstract semantic expression obtaining unit to obtain a plurality of abstract semantic expressions from an abstract semantic database, wherein each of the plurality of abstract semantic expressions comprises a semantic-lacking element; a receiving unit to receive an initial request message from a user; an abstract semantic recommending module, coupled to the abstract semantic expression obtaining unit and the receiving unit, to acquire one or more abstract semantic expressions corresponding to the initial request message by performing an abstract semantic recommending process on the initial request message based on the plurality of abstract semantic expressions; a filling unit, coupled to the abstract semantic recommending module, to extract, from the initial request message, an element corresponding to the semantic-lacking element of the one or more abstract semantic expressions, and to fill the extracted element into the semantic-lacking element to obtain one or more specific semantic expressions corresponding to the initial request message; and a storing unit to store the initial request message and the one or more specific semantic expressions into the intelligent knowledge base.

Another exemplary device in accordance with the present disclosure comprises: a preset knowledge subject obtaining unit to obtain a plurality of preset knowledge subjects from a subject domain database, wherein each preset knowledge subject comprises a standard question and one or more extended questions; a receiving unit to receive an initial request message; a calculation unit, coupled to the preset knowledge subject obtaining unit and the receiving unit, to perform a semantic similarity calculation on the initial request message and the plurality of preset knowledge subjects to obtain a plurality of semantic similarity calculation results; a determination unit, coupled to the calculation unit, to determine whether a largest one of the plurality of semantic similarity calculation results is greater than a similarity threshold value; and a storing unit to, when the largest one of the plurality of semantic similarity calculation results is greater than the similarity threshold value, store into the intelligent knowledge base the initial request message and the standard question and the one or more extended questions of a preset knowledge subject corresponding to the largest one of the plurality of semantic similarity calculation results.

Yet another exemplary device in accordance with the present disclosure comprises: a preset knowledge subject obtaining unit to obtain a plurality of preset knowledge subjects from a subject domain database, wherein each preset knowledge subject comprises a standard question and one or more extended questions; a receiving unit to receive an initial request message; a calculation unit, coupled to the preset knowledge subject obtaining unit and the receiving unit, to perform a semantic similarity calculation on the initial request message and the plurality of preset knowledge subjects to obtain a plurality of semantic similarity calculation results; a determination unit to determine whether a largest one of the plurality of semantic similarity calculation results is greater than a similarity threshold value; an abstract semantic expression obtaining unit to obtain a plurality of abstract semantic expressions from an abstract semantic database, wherein each of the plurality of abstract semantic expressions comprises a semantic-lacking element; an abstract semantic recommending module, coupled to the abstract semantic expression obtaining unit and the receiving unit, to obtain one or more abstract semantic expressions corresponding to the initial request message by performing, when the largest one of the plurality of semantic similarity calculation results is smaller than the similarity threshold value, an abstract semantic recommending process on the initial request message based on the plurality of abstract semantic expressions; a filling unit, coupled to the abstract semantic recommending module, to extract from the initial request message an element corresponding to the semantic-lacking element of the one or more abstract semantic expressions, and to fill the extracted element into the semantic-lacking element to obtain one or more specific semantic expressions corresponding to the initial request message; and a storing unit to, when the largest one of the plurality of semantic similarity calculation results is greater than the similarity threshold value, store into the intelligent knowledge base the initial request message and the standard question and the one or more extended questions of a preset knowledge subject corresponding to the largest one of the plurality of semantic similarity calculation results, or/and when the largest one of the plurality of semantic similarity calculation results is smaller than the similarity threshold value, store the initial request message and the one or more specific semantic expressions into the intelligent knowledge base.

The present disclosure also includes an exemplary method for constructing an intelligent knowledge base. An exemplary method in accordance with the present disclosure comprises: obtaining, via an intelligent-knowledge-base constructing device, a plurality of abstract semantic expressions, wherein each of the plurality of abstract semantic expressions comprises a semantic-lacking element; receiving an initial request message from a user; acquiring, via the intelligent-knowledge-base constructing device, one or more abstract semantic expressions corresponding to the initial request message by performing an abstract semantic recommending process on the initial request message based on the plurality of abstract semantic expressions; extracting, from the initial request message, an element corresponding to the semantic-lacking element of the one or more abstract semantic expressions; filling the extracted element into the semantic-lacking element to obtain one or more specific semantic expressions corresponding to the initial request message; and storing the initial request message and the one or more specific semantic expressions into the intelligent knowledge base.

Another exemplary method in accordance with the present disclosure comprises: obtaining, via an intelligent-knowledge-base constructing device, a plurality of preset knowledge subjects from a subject domain database, wherein each preset knowledge subject comprises a standard question and one or more extended questions; receiving an initial request message; performing, via the intelligent-knowledge-base constructing device, a semantic similarity calculation on the initial request message and the plurality of preset knowledge subjects to obtain a plurality of semantic similarity calculation results; determining whether a largest one of the plurality of semantic similarity calculation results is greater than a similarity threshold value; and upon determining that the largest one of the plurality of semantic similarity calculation results is greater than the similarity threshold value, storing into the intelligent knowledge base the initial request message and the standard question and the one or more extended questions of a preset knowledge subject corresponding to the largest one of the plurality of semantic similarity calculation results.

Yet another exemplary method in accordance with the present disclosure comprises: obtaining, via an intelligent-knowledge-base constructing device, a plurality of preset knowledge subjects from a subject domain database, wherein each preset knowledge subject comprises a standard question and one or more extended questions; receiving an initial request message; performing, via the intelligent-knowledge-base constructing device, a semantic similarity calculation on the initial request message and the plurality of preset knowledge subjects to obtain a plurality of semantic similarity calculation results; determining whether a largest one of the plurality of semantic similarity calculation results is greater than a similarity threshold value; obtaining a plurality of abstract semantic expressions from an abstract semantic database, wherein each of the plurality of abstract semantic expressions comprises a semantic-lacking element; obtaining one or more abstract semantic expressions corresponding to the initial request message by performing, when the largest one of the plurality of semantic similarity calculation results is smaller than the similarity threshold value, an abstract semantic recommending process on the initial request message based on the plurality of abstract semantic expressions; extracting, from the initial request message, an element corresponding to the semantic-lacking element of the one or more abstract semantic expressions; filling the extracted element into the semantic-lacking element to obtain one or more specific semantic expressions corresponding to the initial request message; and storing, when the largest one of the plurality of semantic similarity calculation results is greater than the similarity threshold value, into the intelligent knowledge base the initial request message and the standard question and the one or more extended questions of a preset knowledge subject corresponding to the largest one of the plurality of semantic similarity calculation results, or/and storing when the largest one of the plurality of semantic similarity calculation results is smaller than the similarity threshold value, the initial request message and the one or more specific semantic expressions into the intelligent knowledge base.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Devices, systems, and methods for constructing an intelligent knowledge base such as a question-answer knowledge base based on semantic similarity calculation and/or abstract semantic recommendation, according to embodiments of the present disclosure, are provided herein to address the above described needs.

Figure 1A:
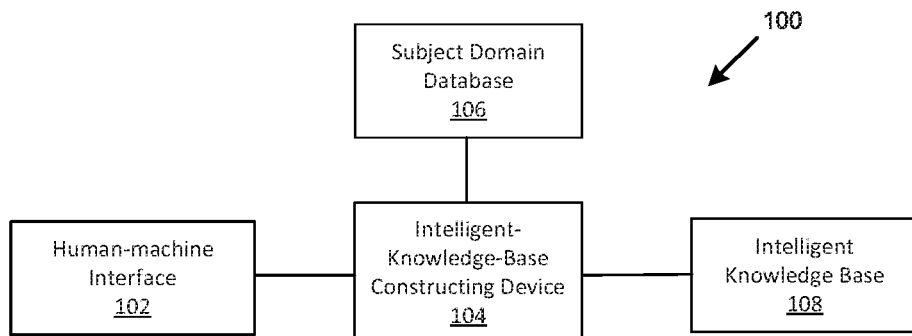
FIGS. 1A-1C each illustrate a block diagram of an exemplary system for constructing an intelligent knowledge base, according to embodiments of the present disclosure.

FIG. 1A illustrates a block diagram of an exemplary system 100 for constructing an intelligent knowledge base based on semantic similarity calculation, consistent with the present disclosure. Exemplary system 100 can include, among other things, a human-machine interface 102, an intelligent-knowledge-base constructing device 104, a subject domain database 106, and an intelligent knowledge base 108. Human-machine interface 102 is coupled, through wired or wireless communication means, to intelligent-knowledge-base constructing device 104, which is further coupled to a subject domain database 106 and an intelligent knowledge base 108 through wired or wireless communication means.

Human-machine interface 102 can be a hardware device such as a computer, a PDA, a cell phone, a laptop, a desktop, or any computing device running one or more computer programs to provide an interface for a human user. Through the interface, the user can input an initial request message and interact with intelligent-knowledge-base constructing device 104, via text or voice. The initial request message can be text or voice. In some embodiments, the initial voice request message may be converted into text.

Intelligent-knowledge-base constructing device 104 can be a hardware device running one or more computer programs to construct an intelligent knowledge base such as a question-answer knowledge base, based on semantic similarity calculation, abstract semantic recommendation, or other algorithms. For example, in some embodiments, device 104 receives the initial request message from human-machine interface 102 and acquires preset knowledge subjects from subject domain database 106. Device 104 then performs a semantic similarity calculation on the initial request message and the preset knowledge subjects to obtain semantic similarity calculation results, and stores the initial request message and the preset knowledge subjects into the intelligent knowledge base 108 based on the semantic similarity calculation results. Further details will be described below.

Subject domain database 106 is a storage device storing a structured collection of records or data of preset knowledge subjects such as business logic in a specific business field, e.g., communication field, finance field, e-government field, e-commerce field, daily life field, intelligent home field, intelligent transportation field, etc. A preset knowledge subject may include a standard question and one or more extended questions. The one or more extended questions are different expression forms of the standard question, but have a same semantic meaning as the standard question. The one or more extended questions are different expression forms of the standard question, but have a same semantic meaning as the standard question. In order to make the subject domain database can be used in different intelligent knowledge base in a same filed, the preset knowledge subjects may be common knowledge in the domain field. In some embodiments, the preset knowledge subject not only includes a standard question and one or more extended questions, but also includes an answer corresponding to the standard question and the one or more extended questions. In some embodiments, the preset knowledge subjects stored in the subject domain database have a text form. In other embodiments, the preset knowledge subjects may be stored in other forms. For example, the standard question and the extended questions of the preset knowledge subject are stored in a text form, while the corresponding answers are stored in a voice form, a video form or other multi-media forms. When there are a plurality of preset knowledge subjects, each preset knowledge subject has a corresponding storage space and a corresponding storage address. In some embodiments, database 106 arranges the memory according to the data structures and relations stored there to improve the storage efficiency. Further details will be described below.

Intelligent knowledge base 108 such as a question-answer knowledge base is a storage device storing a structured collection of records or data of initial request messages, preset knowledge subjects including standard questions and extended questions, and/or specific semantic expressions. In some embodiments, intelligent knowledge base 108 arranges the memory according to the data structures and relations stored there to improve the storage efficiency. Further details will be described below.

Figure 1B:
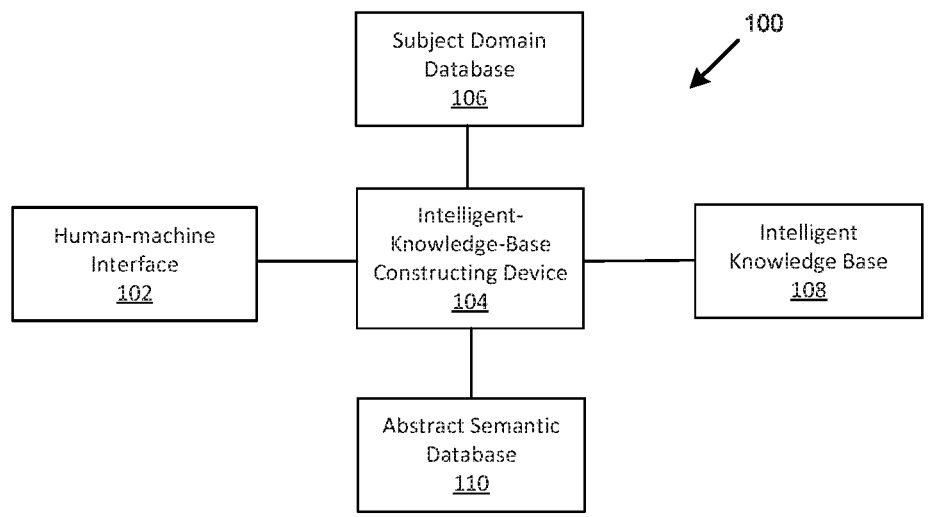

FIG. 1B illustrates a block diagram of another exemplary system 100 for constructing an intelligent knowledge base based on semantic similarity calculation and abstract semantic recommendation, consistent with the present disclosure. In some embodiments, exemplary system 100 may also include an abstract semantic database 110, in addition to human-machine interface 102, intelligent-knowledge-base constructing device 104, subject domain database 106, and an intelligent knowledge base 108, as described above.

Abstract semantic database 110 is a storage device storing a structured collection of records or data of abstract semantic expressions each of which includes a semantic-lacking element. An abstract semantic expression may include not only a semantic-lacking element, but also a semantic rule word. In some embodiments, the semantic rule word is marked with wordclass information. The wordclass information indicates that the semantic rule word belongs to a wordclass. A wordclass includes several keywords having a same usage and a similar semantic meaning. In some embodiments, database 106 arranges the memory according to the data structures and relations stored there to improve the storage efficiency. Further details about database 110 will be described below.

In some embodiments, as shown in FIG. 1B, intelligent-knowledge-base constructing device 104 receives an initial request message from human-machine interface 102 and acquires preset knowledge subjects from subject domain database 106. Device 104 then performs a semantic similarity calculation on the initial request message and the preset knowledge subjects to obtain semantic similarity calculation results. Further, device 104 obtains abstract semantic expressions each including a semantic-lacking element from abstract semantic database 110. Device 104 then performs an abstract semantic recommending process on the initial request message based on the semantic similarity calculation results and the abstract semantic expressions to obtain one or more abstract semantic expressions corresponding to the initial request message. Also, device 104 extracts, from the initial request message, an element corresponding to the semantic-lacking element of the one or more abstract semantic expressions. Afterwards, device 104 fills the extracted element into the semantic-lacking element to obtain one or more specific semantic expressions corresponding to the initial request message. Finally, device 104 stores the initial request message and the one or more specific semantic expressions into intelligent knowledge base 108. Further details will be described below.

Figure 1C:
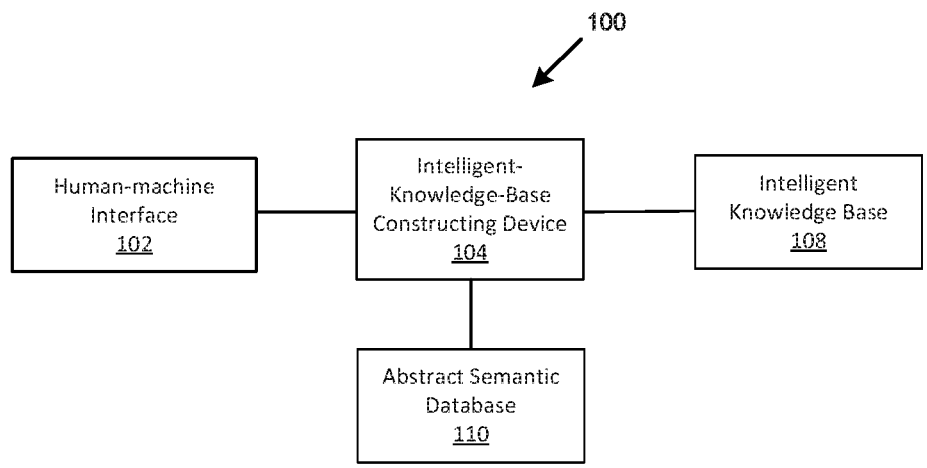

FIG. 1C illustrates a block diagram of another exemplary system 100 for constructing an intelligent knowledge base based on abstract semantic recommendation, consistent with the present disclosure. As shown in FIG. 1C, in some embodiments, exemplary system 100 may also include an abstract semantic database 110, in addition to human-machine interface 102, intelligent-knowledge-base constructing device 104, and an intelligent knowledge base 108, as described above.

In some embodiments, as shown in FIG. 1C, intelligent-knowledge-base constructing device 104 receives an initial request message from human-machine interface 102 and obtains abstract semantic expressions each including a semantic-lacking element from abstract semantic database 110. Device 104 then performs an abstract semantic recommending process on the initial request message based on abstract semantic database 110 to obtain one or more abstract semantic expressions corresponding to the initial request message. Also, device 104 extracts, from the initial request message, an element corresponding to the semantic-lacking element of the one or more abstract semantic expressions. Device 104 then fills the extracted element into the semantic-lacking element to obtain one or more specific semantic expressions corresponding to the initial request message. Afterwards, device 104 stores the initial request message and the one or more specific semantic expressions into intelligent knowledge base 108. Further details will be described below.

The above described database 106, knowledge based 108, and database 110 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. Also, the structured collection stored therein can be organized as a set of queues, a structured file, a relational database, an object-oriented database, or any other appropriate database. Computer software, such as a database management system, may be utilized to manage and provide access to the data stored therein.

It is understood that the devices shown in FIGS. 1A-1C are for illustrative purposes. Certain devices may be removed or combined and other devices may be added. In some embodiments, the above described the devices in each of FIGS. 1A-1C may be located in one computing device. In other embodiments, they may be located on more than one computing devices connected via wide area networks (WANs), local area networks (LANs), wireless networks, or any combination thereof.

Figure 2A:
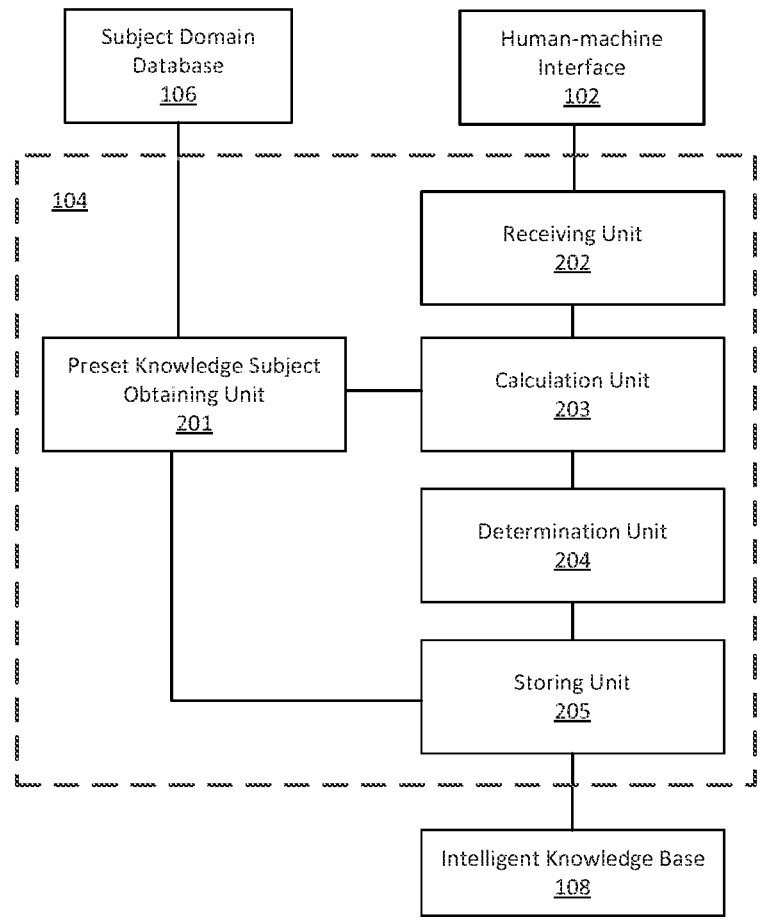
FIGS. 2A-2B each illustrate a block diagram of an exemplary intelligent-knowledge-base constructing device of FIG. 1A, according to embodiments of the present disclosure.
Figure 2B:
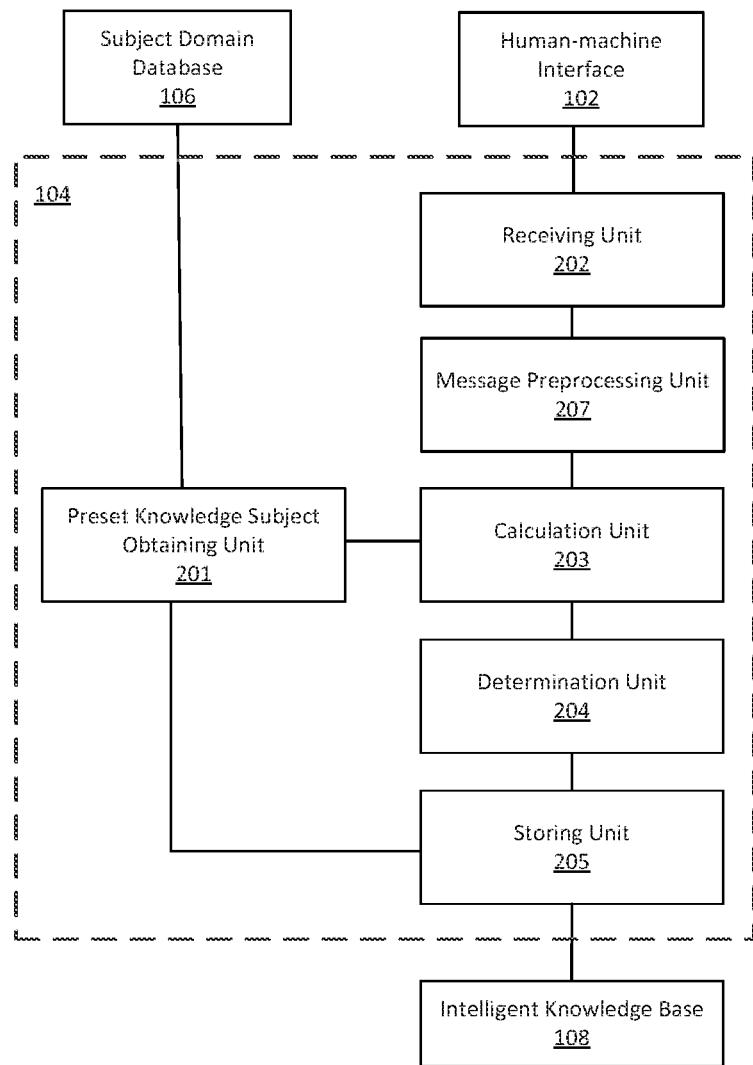

FIGS. 2A-2B each illustrate a block diagram of an exemplary embodiment of intelligent-knowledge-base constructing device 104 of FIG. 1A, consistent with the present disclosure. Device 104 disclosed in FIGS. 2A-2B constructs intelligent knowledge base based on semantic similarity calculation, consistent with the present disclosure.

In FIG. 2A, intelligent-knowledge-base constructing device 104 may include a preset knowledge subject obtaining unit 201, a receiving unit 202, a calculation unit 203, a determination unit 204, and a storing unit 205.

Preset knowledge subject obtaining unit 201 can be a hardware computing device running one or more computer programs to obtain preset knowledge subjects from subject domain database 106. Each of the preset knowledge subjects includes a standard question and one or more extended questions. Unit 201 provides the preset knowledge subjects to calculation unit 203 for further processing, as described below.

Receiving unit 202 can be a hardware computing device running one or more computer programs to receive an initial request message from a user via human-machine interface 102. Unit 202 provides the initial request message to calculation unit 203 for further processing, as described below.

Calculation unit 203 is coupled to preset knowledge subject obtaining unit 201 to receive the preset knowledge subjects and coupled to receiving unit 202 to receive the initial request message. Calculation unit 203 can be a processor or any computing device to perform a semantic similarity calculation. The semantic similarity refers to a matching degree of words and phrases between the initial request message and the preset knowledge subjects, and (or) a semantic conformance. Calculation unit 203 performs a semantic similarity calculation on the initial request message and the preset knowledge subjects, and obtains semantic similarity calculation results. Calculation unit 203 performs the semantic similarity calculation between the initial request message and the standard question, and between the initial request message and each extended question respectively, and defines the largest one of the calculation results as a semantic similarity calculation result between the initial request message and the preset knowledge subject. Unit 203 provides the semantic similarity calculation results to determination unit 204 for further processing, as described below.

In some embodiments, calculation unit 203 adopts one or more methods to perform the semantic similarity calculation, such as a calculation method based on VSM (Vector Space Model), a calculation method based on LSI (Latent Semantic Indexing) model, a semantic similarity calculation method based on attribute theory, or a semantic similarity calculation method based on Hamming distance. It should be noted that, the similarity calculation method may be other semantic similarity calculation method.

Determination unit 204 can be a computer program or a hardware computing device running one or more computer programs to determine whether the largest one of the semantic similarity calculation results is greater than a similarity threshold value. In some embodiments, the similarity threshold value ranges from, for example, 0.7 to 1.0. Unit 204 provides the determination result to storing unit 205 for further processing.

Storing unit 205 can be a hardware computing device running one or more computer programs to store data into intelligent knowledge base 108 according to the determination result provided by determination unit 204. For example, when the largest one of the semantic similarity calculation results is greater than the similarity threshold value, storing unit 205 stores into intelligent knowledge base 108 the initial request message, and the standard question and the one or more extended questions of a preset knowledge subject that is corresponding to the largest one of the semantic similarity calculation results.

In some embodiments, intelligent-knowledge-base constructing device 104 may also include an answer providing unit (not shown in FIG. 2A). The answer providing unit can be a hardware computing device running one or more computer programs to provide an answer corresponding to the initial request message. The storing unit stores the initial request message and corresponding answer into intelligent knowledge base 108.

In some embodiments, intelligent-knowledge-base constructing device 104 may further include an extracting unit. The extracting unit can be a hardware computing device running one or more computer programs to extract portions of preset knowledge subjects. For example, after the receiving unit stops receiving initial request messages, the extracting unit extracts at least portions of the preset knowledge subjects that are not stored in intelligent knowledge base 108. Storing unit 205 stores the preset knowledge subjects extracted by the extracting unit into intelligent knowledge base 108.

Now referring to FIG. 2B, in some embodiments, intelligent-knowledge-base constructing device 104 may further include a message preprocessing unit 207, in addition to preset knowledge subject obtaining unit 201, receiving unit 202, calculation unit 203, a determination unit 204, and storing unit 205, as disclosed in FIG. 2A and described above.

Message preprocessing unit 207 can be a computer program or a hardware computing device running one or more computer programs to preprocess the initial request message received from human-machine interface via receiving unit 202. Unit 207 extracts representative features from messages to be updated. The representative features are used for similarity calculation. In some embodiments, the message preprocessing may include a word segmentation process and a stop word removal process. Further, the text preprocessing may also include removing some of meaningless words, for example, "I", "want", "what", etc., which may not be helpful in the semantic similarity calculation.

Figure 2C:
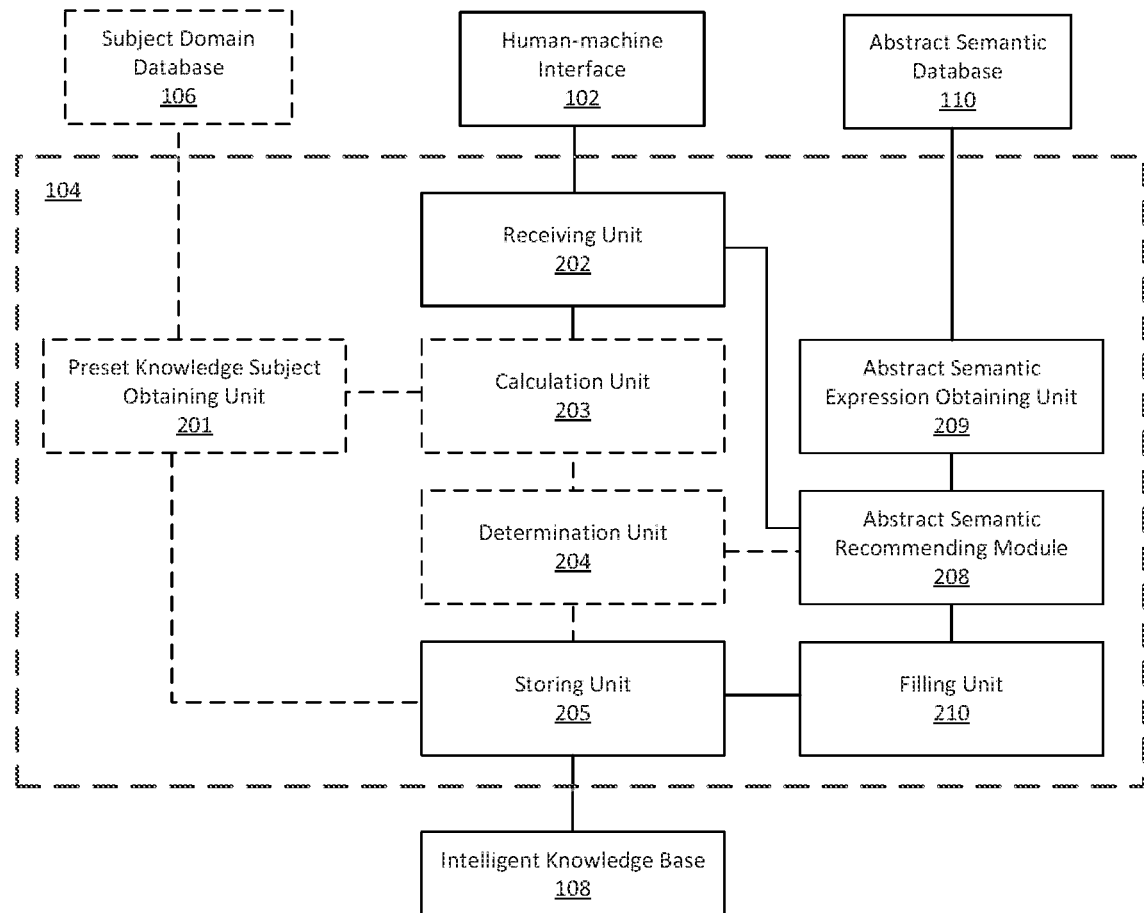
FIGS. 2C-2E each illustrate a block diagram of an exemplary intelligent-knowledge-base constructing device of FIG. 1B or 1C, according to embodiments of the present disclosure.
Figure 2D:
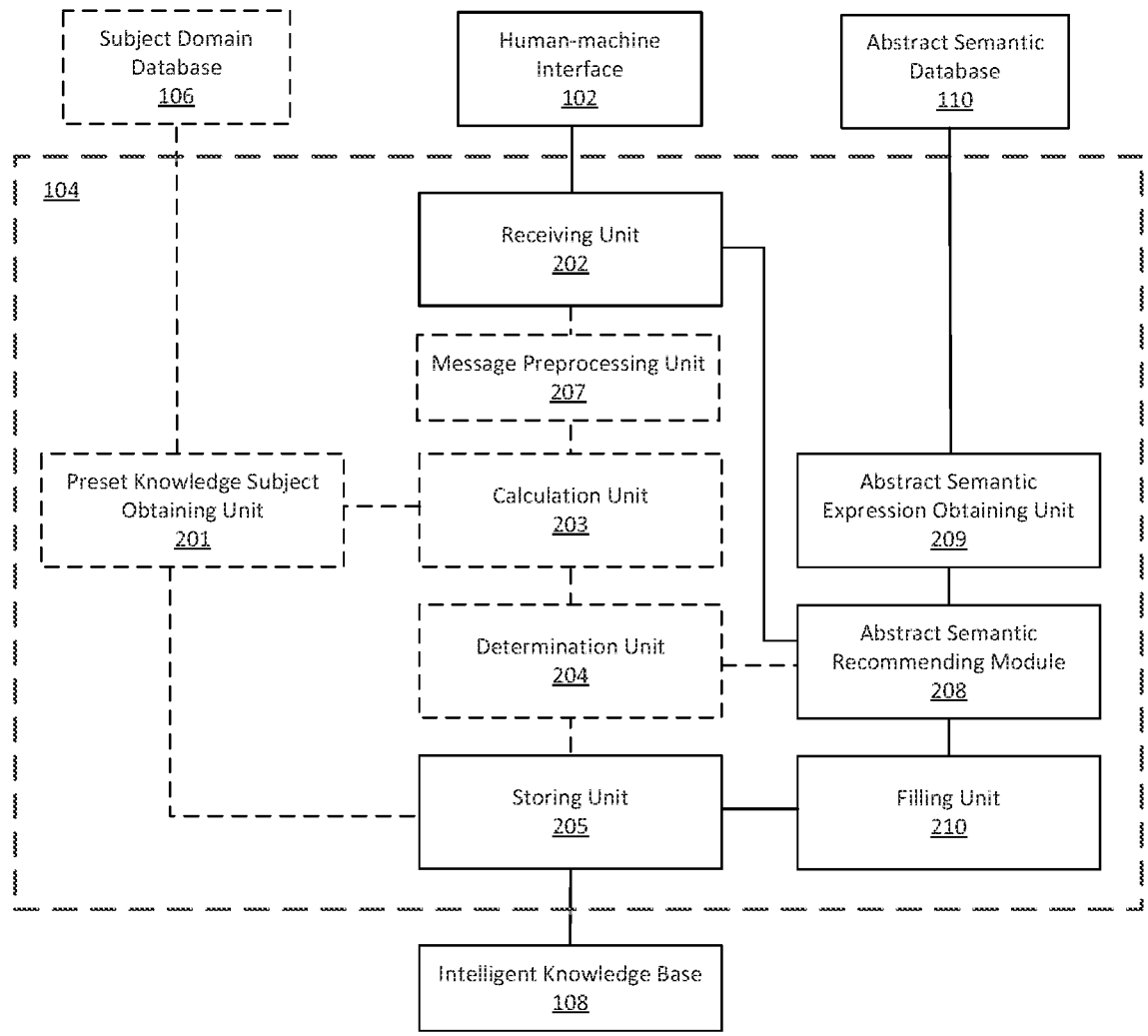
Figure 2E:
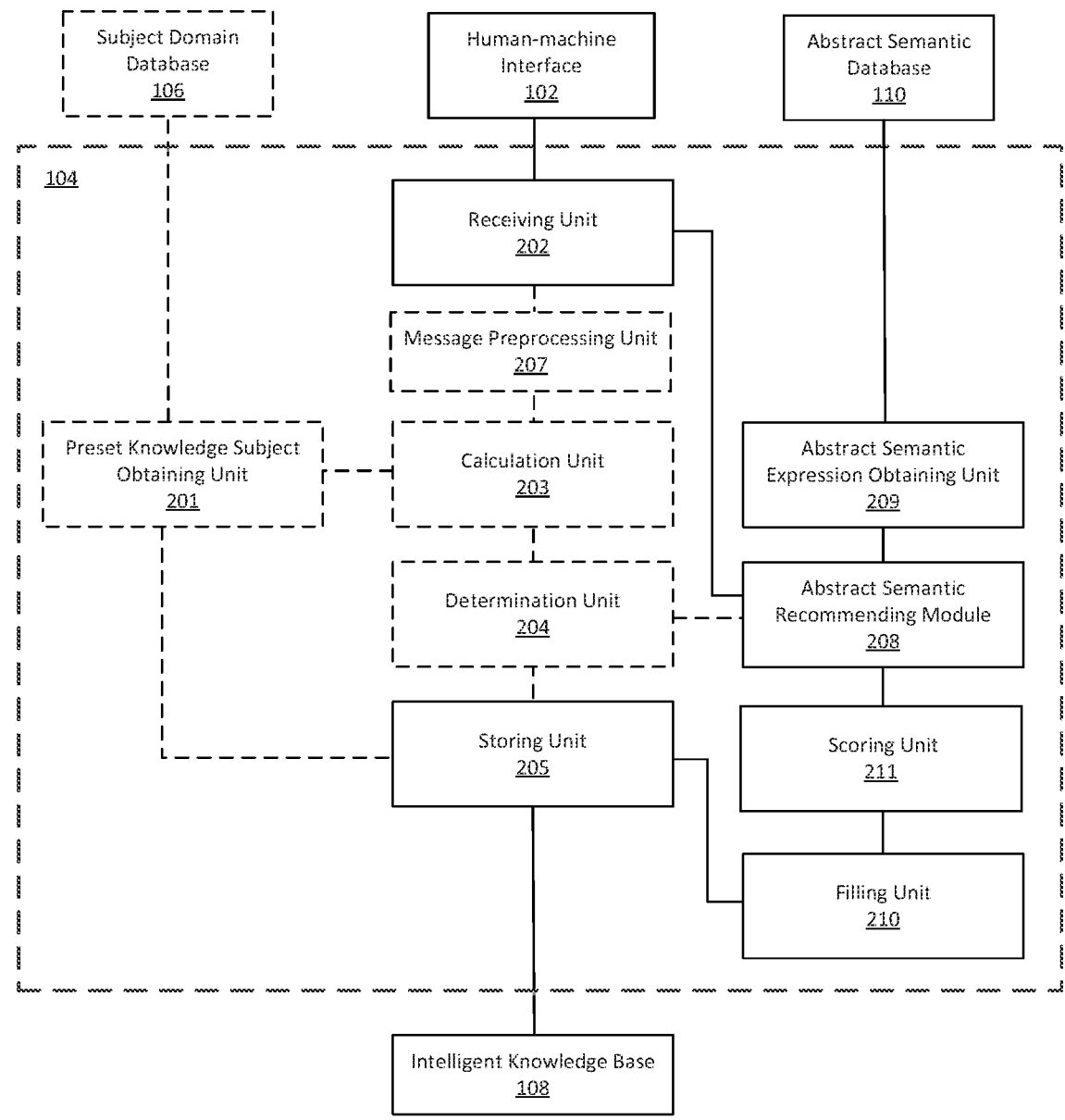

FIGS. 2C-2E each illustrate a block diagram of an exemplary embodiment of intelligent-knowledge-base constructing device 104 of FIG. 1B or 1C, consistent with the present disclosure. Device 104 disclosed in FIGS. 2C-2E constructs intelligent knowledge base based on semantic similarity calculation and/or abstract semantic recommendation, consistent with the present disclosure. In some embodiments, device 104 constructs intelligent knowledge base based on abstract semantic recommendation and thus may not include components facilitating semantic similarity calculation. Accordingly, subject domain database 106, preset knowledge subject obtaining unit 201, receiving unit 202, calculation unit 203, determination unit 204, and message preprocessing unit 207 are illustrated as dotted blocks and connections between them are illustrated as dotted lines in FIGS. 2C-2E.

In FIG. 2C, intelligent-knowledge-base constructing device 104 may further include an abstract semantic recommending module 208, an abstract semantic expression obtaining unit 209, and a filling unit 210, in addition to those components (i.e., preset knowledge subject obtaining unit 201, receiving unit 202, calculation unit 203, determination unit 204, and storing unit 205) disclosed in FIG. 2A as described above. Abstract semantic recommending module 208, abstract semantic expression obtaining unit 209, and filling unit 210 will be described in details below. The detailed description of those components also shown in FIG. 2A is provided above and will not be repeated here.

Abstract semantic expression obtaining unit 209 can be a hardware computing device running one or more computer programs to obtain one or more abstract semantic expressions from abstract semantic database 110 and provide to abstract semantic recommending module 208 for further processing. Each of the abstract semantic expressions includes a semantic-lacking element.

Figure 3A:
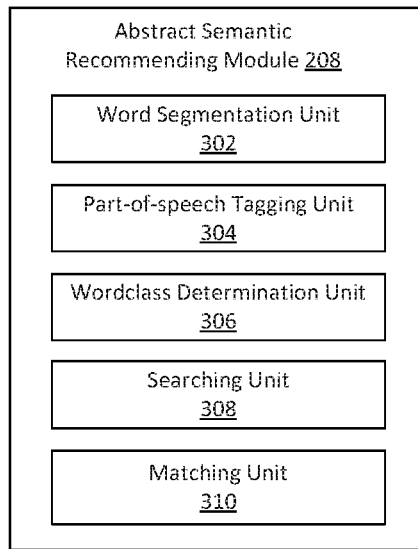
FIGS. 3A-3B each illustrates a block diagram of an exemplary abstract semantic recommending module of FIGS. 2C-2E, according to embodiments of the present disclosure.
Figure 3B:
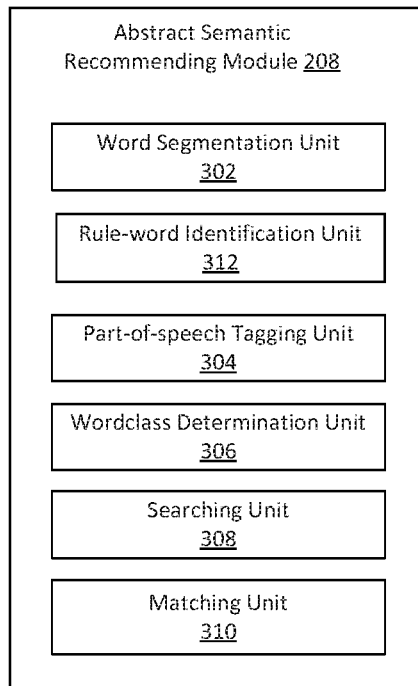

Abstract semantic recommending module 208 can be a hardware computing device running one or more computer programs to perform an abstract semantic recommending process on the initial request message received from human-machine interface 102 via receiving unit 202. For example, when determination unit 204 determines that the largest one of the semantic similarity calculation results is smaller than the similarity threshold value, module 208 performs an abstract semantic recommending process on the initial request message based on the abstract semantic expressions received from abstract semantic database 110. Based on the recommendation, module 208 can obtain one or more abstract semantic expressions corresponding to the initial request message. FIGS. 3A-3B each illustrates a block diagram of an exemplary abstract semantic recommending module 208, according to embodiments of the present disclosure.

As shown in FIG. 3A, abstract semantic recommending module 208 includes a word segmentation unit 302, a part-of-speech tagging unit 304, a wordclass determination unit 306, a searching unit 308, and a matching unit 310.

Word segmentation unit 302 can be a hardware computing device running one or more computer programs to perform a word segmentation process on the initial request message. The segmentation process breaks the message into one or more single words. The word segmentation process may use a forward (reverse) maximum matching method, a best matching method, a word by word traversal method, a word frequency statistics method, or other suitable word segmentation methods.

Part-of-speech tagging unit 304 can be a hardware computing device running one or more computer programs to perform a part-of-speech tagging process on each single word, so as to obtain the part-of-speech information of each single word. The part-of-speech tagging process is called grammatical tagging to mark up a word in a text (corpus) as corresponding to a particular part (such as a noun, a verb, an adjective, an adverb, etc.) of speech, based on both its definition and its context, e.g., its relationship with adjacent and related words in a phrase, sentence, or paragraph.

Wordclass determination unit 306 can be a hardware computing device running one or more computer programs to perform a wordclass determination process on each single word. Based on the determination process, unit 306 can obtain the wordclass information of each single word.

Searching unit 308 can be a hardware computing device running one or more computer programs to perform a searching process on the abstract semantic expressions obtained by the abstract semantic expression obtaining unit 209 to obtain an abstract semantic candidate set relevant to the initial request message. The abstract semantic candidate set includes a plurality of abstract semantic expressions.

Matching unit 310 can be a hardware computing device running one or more computer programs to perform a matching process on the abstract semantic expressions in the abstract semantic candidate set based on the part-of-speech information and the wordclass information. Based on the matching process, unit 310 can obtain an abstract semantic expression corresponding to the initial request message.

In some embodiments, the abstract semantic expression includes a semantic rule word. At least parts of semantic rule words of the abstract semantic expressions in the abstract semantic candidate set, obtained by the searching unit, are the same, or belong to a same wordclass, as parts of the single words of the initial request message.

Matching unit 310 determines the abstract semantic expression corresponding to the initial request message based on the following conditions: the part-of-speech corresponding to the semantic-lacking element includes the part-of-speech of the corresponding filling element; keywords of the initial request message except the filling element are the same or belong to a same wordclass as the semantic rule words; and the abstract semantic expression has a same order as the initial request message.

FIG. 3B illustrates a block diagram of another exemplary abstract semantic recommending module. As shown in FIG. 3B, abstract semantic recommending module 208 includes a rule-word identification unit 312, in addition to a word segmentation unit 302, a part-of-speech tagging unit 304, a wordclass determination unit 306, a searching unit 308, and a matching unit 310 of FIG. 3B as described above. Rule-word identification unit 312 can be a hardware computing device running one or more computer programs to identify each single word as a semantic rule word or a non-semantic rule word. Part-of-speech tagging unit 304 performs grammatical tagging on each non-semantic rule word to obtain part-of-speech information of the non-semantic rule word. Wordclass determination unit 306 performs a wordclass determination process on each semantic rule word to obtain wordclass information of the semantic rule word.

Referring back to FIG. 2C, filling unit 210 can be a hardware computing device running one or more computer programs to fill an element into the semantic-lacking element of the abstract semantic expressions to obtain specific semantic expressions corresponding to the initial request message. For example, after the one or more abstract semantic expressions corresponding to the initial request message are obtained, extracting, from the initial request message, an element corresponding to the semantic-lacking element of the one or more abstract semantic expressions; filling the extracted element into the semantic-lacking element to obtain one or more specific semantic expressions corresponding to the initial request message.

Based on the results of determination unit 204 and filling unit 210, storing unit 205 can store data into intelligent knowledge base 108. For example, when the largest one of the plurality of semantic similarity calculation results is greater than the similarity threshold value, storing unit 205 stores into intelligent knowledge base 108 the initial request message, and the standard question and the one or more extended questions of a preset knowledge subject corresponding to the largest one of the semantic similarity calculation results. When the largest one of the semantic similarity calculation results is smaller than the similarity threshold value, storing unit 205 stores into intelligent knowledge base 108 the initial request message and the one or more specific semantic expressions.

In some embodiments, device 104 does not need the semantic similarity information to construct the intelligent knowledge base. Specifically, abstract semantic recommending module 208 receives an initial request message from human-machine interface 102 via receiving unit 202 and obtains, via abstract semantic expression obtaining unit 209, abstract semantic expressions each including a semantic-lacking element from abstract semantic database 110. Module 208 then performs an abstract semantic recommending process on the initial request message based on abstract semantic database 110 to obtain one or more abstract semantic expressions corresponding to the initial request message. Filling unit 210 extracts, from the initial request message, an element corresponding to the semantic-lacking element of the one or more abstract semantic expressions. And then, filling unit 210 fills the extracted element into the semantic-lacking element to obtain one or more specific semantic expressions corresponding to the initial request message. Afterwards, storing unit 205 stores the initial request message and the one or more specific semantic expressions into intelligent knowledge base 108.

Now referring to FIG. 2D, in some embodiments, intelligent-knowledge-base constructing device 104 includes abstract semantic recommending module 208, abstract semantic expression obtaining unit 209, and filling unit 210, in addition to those components (i.e., preset knowledge subject obtaining unit 201, receiving unit 202, message preprocessing unit 207, calculation unit 203, determination unit 204, and storing unit 205) disclosed in FIG. 2B as described above. The detailed description for each component in FIG. 2D has been provided above and will not be repeated here.

With reference to FIG. 2E, intelligent-knowledge-base constructing device 104 may further include a scoring unit 211, in addition to those components disclosed in FIG. 2D as described above. Scoring unit 211 can be a hardware computing device running one or more computer programs to perform a scoring process on an abstract semantic expression corresponding to the initial request message. For example, when a number M of the abstract semantic expressions corresponding to the initial request message is larger than a number N of the specific semantic expressions, scoring unit 211 performs a scoring process on each abstract semantic expression corresponding to the initial request message. Filling unit 210 then extracts from the initial request message elements corresponding to semantic-lacking elements of N abstract semantic expressions having higher score. Further, filling unit 210 fills the extracted elements into corresponding semantic-lacking elements of the N abstract semantic expressions having higher score, so as to obtain N specific semantic expressions corresponding to the initial request message.

Scoring unit 211 performs a scoring process according to one or more methods consistent with the present disclosures. For example, scoring unit 211 can set a higher score to the abstract semantic expression if the number of the matched semantic-lacking elements is higher. In some embodiments, scoring unit 211 can define a semantic-lacking element of the abstract semantic expression as a core semantic element, and set a higher score to the abstract semantic expression if the semantic-lacking element is more close to the core semantic element. In some embodiments, scoring unit 211 can set a higher score to the abstract semantic expression if the confidence value of the part-of-speech is higher. In some embodiments, scoring unit 211 can set a higher score to the abstract semantic expression if a priority level is higher, wherein the priority levels is pre-assigned to the abstract semantic expression. Further, in some embodiments, scoring unit 211 can set a higher score to the abstract semantic expression if a probability is higher, wherein the probability is determined based on a natural language model, and corresponds to whether data information obtained by filling segmentation words of a large amount of crawled corpus data into the abstract semantic expression has correct semantic information. Scoring unit 211 can adopt one or more that above methods to perform the scoring.

The illustrated configuration of intelligent-knowledge-base constructing device 104 in each of FIGS. 2A-2E is exemplary only, and persons of ordinary skill in the art will appreciate that the various illustrated elements may be provided as discrete elements or be combined, and be provided as any combination of hardware and software.

Figure 4:
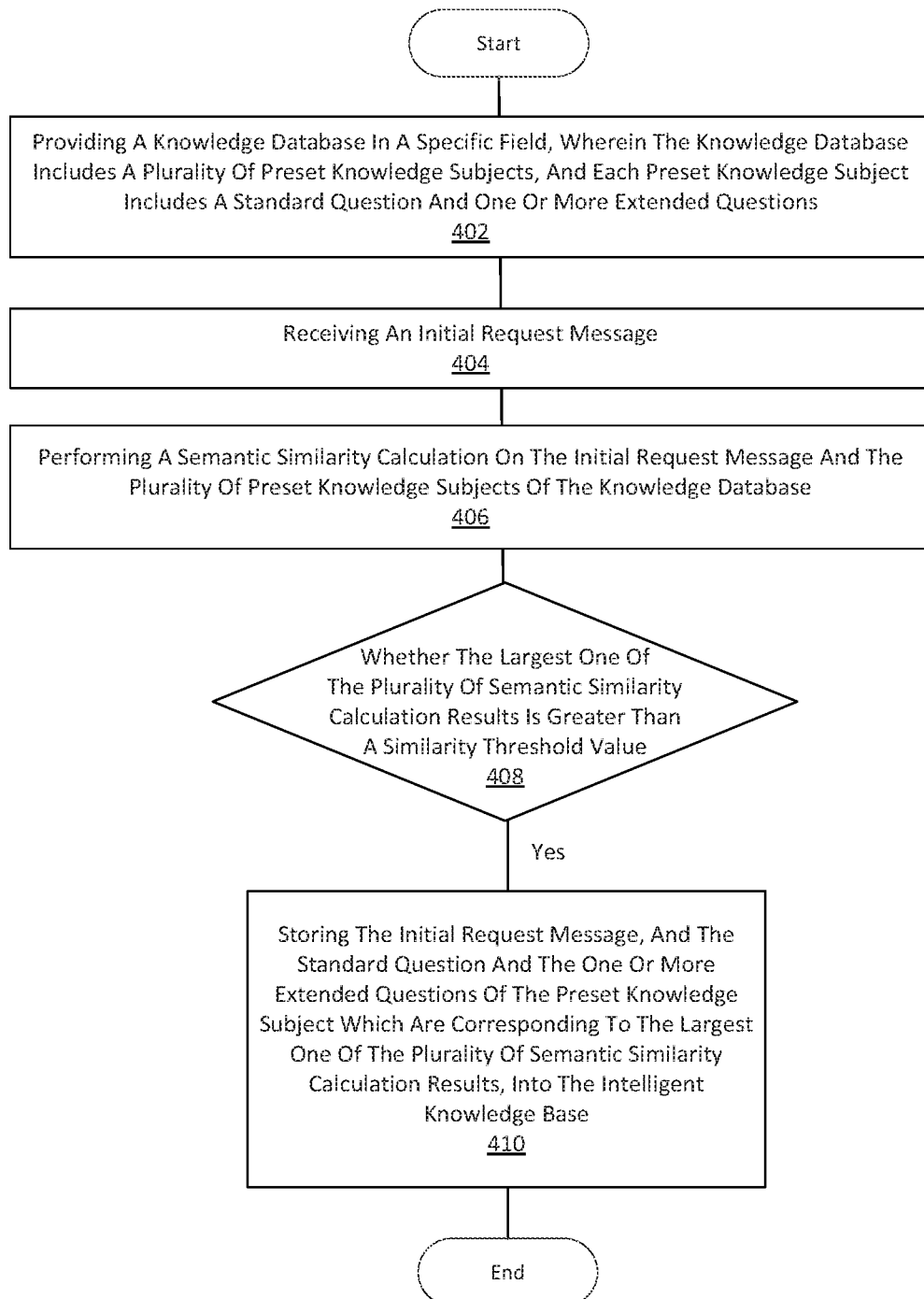
FIG. 4 illustrates a flow chart of an exemplary method for constructing an intelligent knowledge base according to embodiments of the present disclosure.

FIG. 4 illustrates a flow chart of an exemplary method for intelligent-knowledge-base constructing device 104 of FIG. 2A or 2B constructing an intelligent knowledge base based on semantic similarity calculation, according to embodiments of the present disclosure. The flow chart includes steps 402 through 410.

Specifically, at step 402, intelligent-knowledge-base constructing device 104 obtains a plurality of preset knowledge subjects from a subject domain database 106 in a specific field. Each preset knowledge subject includes a standard question and one or more extended questions. It should be noted that, the standard question and the extended question not only can be expressed in semantic expression forms, but can also be expressed in specific question forms. In some embodiments, the preset knowledge subject not only includes a standard question and one or more extended questions, but also includes an answer corresponding to the standard question and the one or more extended questions.

For example, regarding how to register a CRBT (Color Ring Back Tone) service in the telecommunication field, the plurality of preset knowledge subjects, which are stored in the subject domain database and are relevant to "how to register a CRBT service," include: "how to register a CRBT service," "what's the step for registering a CRBT service," "what should I do if I want to register a CRBT service," and "how does a CRBT service be registered." One of the above questions is defined as the standard question, and the others are defined as the extended questions. In some embodiments, the first question "how to register a CRBT service" is defined as the standard question, and the other three questions are defined as the corresponding extended questions. In other embodiments, other questions may be defined as the standard question. In some embodiments, the subject domain database may further include answers to the question "how to register a CRBT service."

The subject domain database further includes other preset knowledge subjects, for example, a present knowledge subject on how to register a GPRS service, a preset knowledge subject on how to suspend the mobile phone service, or a present knowledge subject on how to register a discount service for long distance communication.

At step 404, intelligent-knowledge-base constructing device 104 receives an initial request message from a user via human-machine interface 102. In some embodiments, the initial request message is a message which is an input from human-machine interface 102. For example, the initial request message is a text message which is an input from a keyboard, a touch screen, etc. In some embodiments, the initial request message is a voice message inputted from a microphone and is converted by a speech recognition engine.

For example, regarding how to register a CRBT service as an example, the received initial request message may be "what should I do if I want to register a CRBT service." The method proceeds to step 406.

At step 406, intelligent-knowledge-base constructing device 104 performs a semantic similarity calculation on the initial request message and the plurality of preset knowledge subjects of the subject domain database to obtain a plurality of semantic similarity calculation results. When there are a plurality of preset knowledge subjects, the semantic similarity calculation is performed on the initial request message and each preset knowledge subjects successively, so as to obtain corresponding semantic similarity calculation results.

In some embodiment, when each preset knowledge subject includes a standard question and one or more extended questions, the semantic similarity calculation is performed between the initial request message and the standard question, and between the initial request message and each extended question respectively. The largest one of the calculation results is defined as a semantic similarity calculation result between the initial request message and the preset knowledge subject.

In some embodiments, a process of the semantic similarity calculation may include: performing a similarity calculation on the initial request message and the preset knowledge subject of the subject domain database according to a similarity calculation method, so as to obtain a first feature value corresponding to the initial request message and a second feature value corresponding to the preset knowledge subject. Then the first feature value and the second feature value is compared or processed to obtain a similarity value (or a semantic similarity calculation result). The comparison or processing may be a comparison operation, a subtraction operation or operations in other form. The more the first feature value is close to the second feature value, the higher the similarity value between the initial request message and its corresponding preset knowledge subject is, and vice versa.

It should be noted that, when the semantic similarity calculation is performed, the first feature value and the second feature value can be obtained in parallel (calculating at the same time), or can be obtained in serial (calculating successively).

For example, in some embodiments, intelligent-knowledge-base constructing device 104 may adopt the calculation method based on VSM to perform a semantic similarity calculation on the initial request message and the preset knowledge subjects of the subject domain database. The initial request message and the preset knowledge subjects in the subject domain database may include independent entry groups (T1, T2, ..., Tn). A predetermined weight Wi is assigned to each entry Ti (1≤i≤n) based on its importance in a sentence. T1, T2, ..., Tn are regarded as coordinate axes in an n-dimensional coordinate system, and W1, W2, ..., Wn is regarded as corresponding coordinate values. Thus, an orthogonal entry vector group obtained by resolving (T1, T2, ..., Tn) may constitute a vector space, and the entry can be mapped to a point in the vector space. As all of the initial request message and the preset knowledge subjects in the subject domain database can be mapped to the vector space and be represented by entry vectors (T1, W1, T2, W2, ..., Tn, Wn), a matching problem of sentence information can be transformed to be a matching problem of vectors in a vector space. Specifically, for the initial request message and the preset knowledge subjects in the subject domain database, the semantic similarity calculation result is a ratio between angles corresponding to the two vectors, namely, the ratio between a first angle (a first feature value) of an entry vector corresponding to the preset knowledge subject in the vector space and a second angle (a second feature value) of an entry vector corresponding to the initial request message in the vector space. The more the ratio is close to 1, the higher the similarity of the two entries is. In other embodiments, the similarity of the two entries may be represented by an intersection angle between vectors. The smaller the intersection angle is, the higher the similarity of the two entries is. The intersection angle (similarity value) is a difference value of the first angle (a first feature value) of the entry vector corresponding to the preset knowledge subject in the vector space and the second angle (a second feature value) of the entry vector corresponding to the initial request message in the vector space.

It should be noted that, before performing the semantic similarity calculation, intelligent-knowledge-base constructing device 104 may perform a message preprocessing on the initial request message and the preset knowledge subjects in the subject domain database, so as to extract representative features from the initial request message and the preset knowledge subjects in the subject domain database. The representative features can be used as a basis of similarity calculation to improve the accuracy of the similarity calculation. In some embodiments, the message preprocessing includes a word segmentation processing and a stop word removal processing. Further, the text preprocessing may further include removing some of meaningless words, for example, "I", "want", "what", etc.

In some embodiments, intelligent-knowledge-base constructing device 104 may perform word segmentation processing based on word segmentation principles. The word segmentation principles may be preset in the system. When the word segmentation processing is performed, the preset word segmentation principles is invoked to perform the word segmentation processing on the initial request message and corresponding preset knowledge subjects in the subject domain database, so as to form two entry strings constituted by entries.

A stop word list is pre-established in the stop word removal processing. When the stop word removal processing is performed, a matching process is performed between each entry and entries in the stop word list. If the entry exists in the stop word list, the entry should be deleted from the entry strings after the word segmentation processing.

The word segmentation processing may use a maximum matching method, a best matching method, a word-by-word traversal method, a word frequency statistics method, or other suitable word segmentation method. The stop word removal processing is used to remove some words which are not easy to distinguish and appear frequently. These words may introduce great errors in the process of similarity calculation, and may be regarded as a kind of noise, such as "this", "of", "and", etc.

Taking how to register a CRBT service as an example, the semantic similarity calculation is performed between the received initial request message "how can I register a CRBT service" and some preset knowledge subjects in the subject domain database.

A semantic similarity calculation performed between the initial request message "how can I register a CRBT service" and preset knowledge subjects ("how to register a CRBT service," "what's the step for registering a CRBT service," "what should I do if I want to register a CRBT service," and "how does a CRBT service be registered") is taken as an example. Semantic similarity calculations are performed between the initial request message "how can I register a CRBT service" and "how to register a CRBT service," "what's the step for registering a CRBT service," "what should I do if I want to register a CRBT service," and "how does a CRBT service be registered," respectively, so as to obtain four semantic similarity calculation values. The largest one of the four semantic similarity calculation values is defined as a semantic similarity calculation result.

As there are a plurality of present knowledge subjects in the subject domain database, a plurality of semantic similarity calculation results may be obtained correspondingly.

At step 408, intelligent-knowledge-base constructing device 104 determines whether the largest one of the plurality of semantic similarity calculation results is greater than a similarity threshold value. When the largest one of the plurality of semantic similarity calculation results is greater than the similarity threshold value, the method proceeds to step 410.

The similarity threshold value is preset. In one embodiment, the similarity threshold value is greater than or equal to 0.7, and is less than or equal to 1.0. It should be noted that, the similarity threshold value may be other values.

When the largest one of the plurality of semantic similarity calculation results is greater than the similarity threshold value, the method proceeds to step 410.

At step 410, intelligent-knowledge-base constructing device 104 stores into intelligent knowledge base 108 the initial request message, and the standard question and the one or more extended questions of the preset knowledge subject corresponding to the largest one of the plurality of semantic similarity calculation results.

In some embodiments, when the initial request message and the standard question and the one or more extended questions of a preset knowledge subject corresponding to the largest one of the plurality of semantic similarity calculation results are stored into the intelligent knowledge base, the initial request message is stored as a new standard question, while the standard question and the one or more extended questions of the preset knowledge subject corresponding to the largest one of the plurality of semantic similarity calculation results are stored as new extended questions for the new standard question.

In some embodiment, when the largest one of the plurality of semantic similarity calculation results is greater than the similarity threshold value, and the initial request message and the standard question and the one or more extended questions of a preset knowledge subject corresponding to the largest one of the plurality of semantic similarity calculation results are stored into the intelligent knowledge base, an answer corresponding to the initial request message is provided and is stored into the intelligent knowledge base along with the questions. The provided answer corresponding to the initial request message is an answer provided by the user himself. The answer is corresponding to the initial request message. Thus, the answer stored in the intelligent knowledge base is more accurate.

In another embodiment, when the largest one of the plurality of semantic similarity calculation results is greater than the similarity threshold value, and the initial request message and the standard question and the one or more extended questions of a preset knowledge subject corresponding to the largest one of the plurality of semantic similarity calculation results are stored into the intelligent knowledge base, an answer stored in the subject domain database is stored into the intelligent knowledge base along with the questions. Thus, the efficiency for establishing the intelligent knowledge base is much improved.

If the largest one of the plurality of semantic similarity calculation results is greater than the similarity threshold value, a similarity between the initial request message and the corresponding preset knowledge subject is very high, which means the user wants to store this preset knowledge subject into the intelligent knowledge base. In the method of the present embodiments, after receiving the initial request message input by the user, performing the semantic similarity calculation, and comparing the similarity calculation result with the similarity threshold value, the preset knowledge subject reaching the similarity threshold value and the corresponding initial request message are stored in the intelligent knowledge base. Thus, in the process for constructing the intelligent knowledge base, the user doesn't need to input a plurality of related questions into the intelligent knowledge base. Therefore, the efficiency for constructing the intelligent knowledge base is improved.

Taking how to register a CRBT service as an example to explain, a similarity calculation result between the initial request message ("how can I register a CRBT service") and the preset knowledge subject ("how to register a CRBT service", "what's the step for registering a CRBT service", "what should I do if I want to register a CRBT service", "how does a CRBT service be registered") is greater than the similarity threshold value, and the preset knowledge subject ("how to register a CRBT service", "what's the step for registering a CRBT service", "what should I do if I want to register a CRBT service", "how does a CRBT service be registered") is stored in the intelligent knowledge base.

In some embodiments, when the largest one of the plurality of semantic similarity calculation results is equal to the similarity threshold value, the method goes to step 410.

As the number of initial request message inputted by the user are limited, it is difficult for the initial request messages inputted by the user to correspond to all the preset knowledge subjects in the subject domain database. Also, it is difficult to store all the preset knowledge subjects in the subject domain database into the intelligent knowledge base through step 406-410. Therefore, after stopping receiving initial request messages, intelligent-knowledge-base constructing device 104 may extract at least parts of preset knowledge subjects which are not stored in the intelligent knowledge base, and store the extracted preset knowledge subjects into the intelligent knowledge base, wherein the preset knowledge subjects includes answers.

For example, the subject domain database includes 1000 preset knowledge subjects. All the largest ones of the plurality of results obtained by performing semantic similarity calculations on 500 initial request message inputted by the user and 500 preset knowledge subjects are greater than the similarity threshold value. Thus, all the standard question and extended questions of the 500 preset knowledge subjects are stored in the intelligent knowledge base. However, the remaining 500 preset knowledge subjects are not included in the intelligent knowledge base. Because the preset knowledge subjects in the subject domain database are common knowledge of a filed, the remaining 500 preset knowledge subjects can be efficiently used. If no initial request message is inputted, the remaining 500 preset knowledge subjects may be directly stored in the intelligent knowledge base, so as to fill 500 new knowledge nodes into the intelligent knowledge base.

It should be noted that, when the preset knowledge subject is stored in the intelligent knowledge base, the standard question of the preset knowledge subject serves as a standard question of the corresponding knowledge node in the intelligent knowledge base, the extended question of the preset knowledge subject serves as an extended question of the corresponding knowledge node in the intelligent knowledge base, and the answer of the preset knowledge subject serves as an answer of the corresponding knowledge node in the intelligent knowledge base. Thus, the efficiency of constructing the intelligent knowledge base is improved in the meantime the subject domain database is effectively used.

In order to avoid a situation that the preset knowledge subjects of the subject domain database don't meet the requirements of the intelligent knowledge base, a screening process may be performed on the preset knowledge subjects which are not stored in the intelligent knowledge base, such that only parts of the remaining preset knowledge subjects are stored in the intelligent knowledge base and the accuracy of the intelligent knowledge base is ensured.

Figure 5:
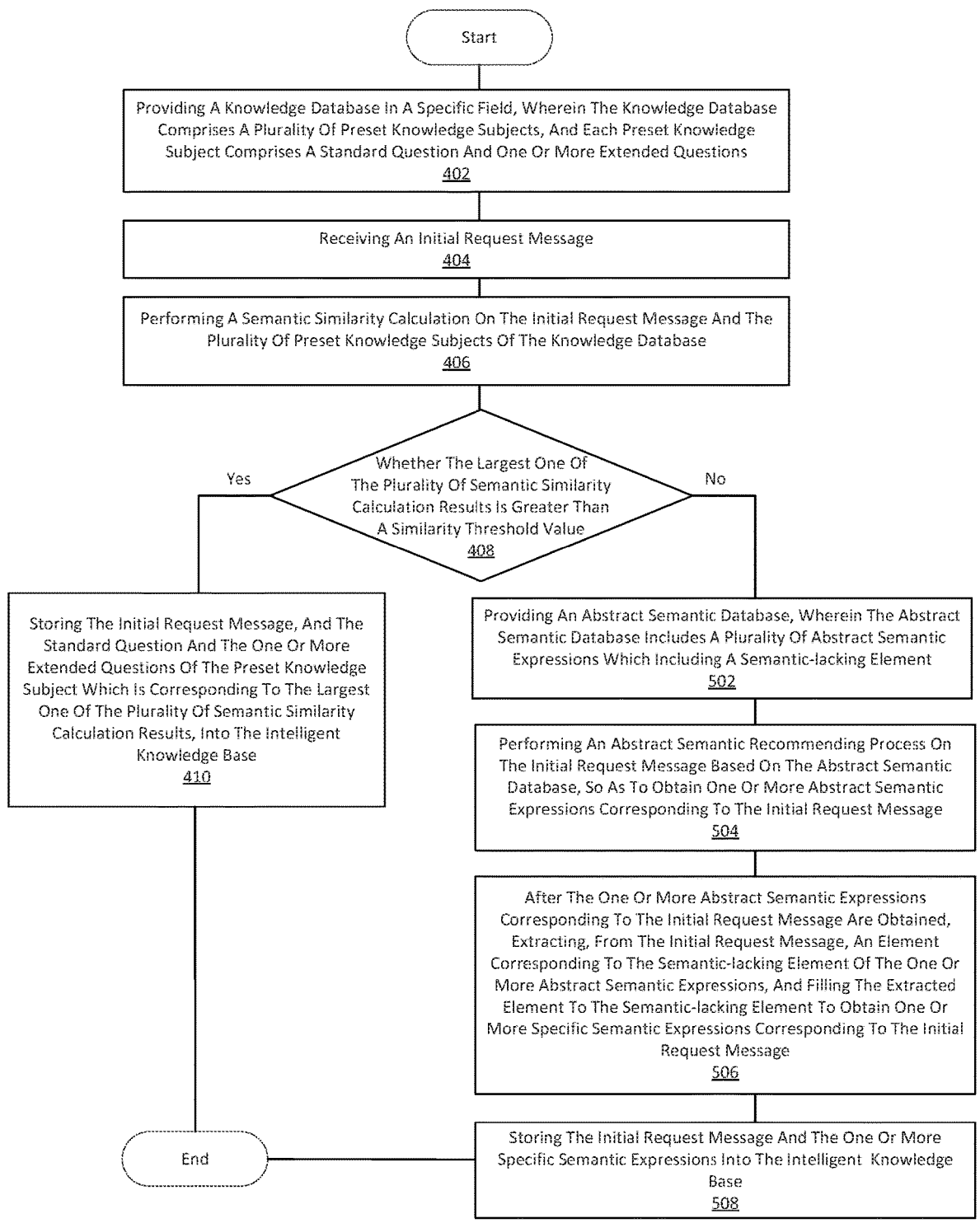
FIG. 5 illustrates a flow chart of another exemplary method for constructing an intelligent knowledge base according to embodiments of the present disclosure.

FIG. 5 illustrates a flow chart of another exemplary method for intelligent-knowledge-base constructing device 104 of FIG. 2C or 2D to construct an intelligent knowledge base according to embodiments of the present disclosure. The flow chart includes steps 502 through 508, in addition to steps 402 through 410 disclosed in FIG. 4 as described above. The detailed description of steps 402 through 410 is provided above and is not repeated here.

As shown in FIG. 5, At step 408, intelligent-knowledge-base constructing device 104 determines whether the largest one of the plurality of semantic similarity calculation results is greater than a similarity threshold value. When the largest one of the plurality of semantic similarity calculation results is greater than the similarity threshold value, the method proceeds to step 410, as described above. When the largest one of the plurality of semantic similarity calculation results is equal to the similarity threshold value, in some embodiments, the method proceeds to step 410, while in other embodiments, the method may proceed to step 502. When the largest one of the plurality of semantic similarity calculation results is smaller than the similarity threshold value, the method proceeds to step 502.

As there is a wide variety of knowledge in the process for establishing the intelligent knowledge base and the intelligent knowledge base may correspond to different fields, the received initial request message may be various. Because it is impossible for the corresponding knowledge base to include all the knowledge subjects, there are some limitations to establish the intelligent knowledge base through the similarity calculation method. In order to further improve the efficiency for establishing the intelligent knowledge base, when the largest one of the plurality of semantic similarity calculation results is smaller than the similarity threshold value, the process for establishing the intelligent knowledge base proceeds to step 502.

For example, in one embodiment, when the received initial request message is "how to open a credit card of the Bank of Communications (BOC) through online banking", a similarity calculation result, obtained by performing a semantic similarity calculation between the initial request message "how to open a credit card of the Bank of Communications (BOC) through online banking" and preset knowledge subjects in the knowledge database, may be smaller than the similarity threshold value. However, the user just wants to establish a knowledge subject related to "how to open a credit card of the BOC through online banking" in the intelligent knowledge base. Thus, another method to construct the intelligent knowledge base is provided in following embodiments of the present disclosure. When the similarity calculation result is smaller than the similarity threshold value, the method can further improve the efficiency for establishing the intelligent knowledge base.

At step 502, intelligent-knowledge-base constructing device 104 obtains a plurality of abstract semantic expressions from an abstract semantic database 110. An abstract semantic expression includes a semantic-lacking element. Subsequently, an element is filled into a place corresponding to the semantic-lacking element in the abstract semantic expression, so as to obtain a specific semantic expression.

An abstract semantic expression may include not only a semantic-lacking element, but also a semantic rule word. In some embodiments, the semantic rule word is marked with wordclass information. The wordclass information indicates that the semantic rule word belongs to a wordclass. A wordclass includes several keywords having a same usage and a similar semantic meaning.

The abstract semantic expression may only include a semantic-lacking element. The abstract semantic expression in this form is defined as a default set. The abstract semantic expression may include a plurality of semantic-lacking element. Each semantic-lacking element has a corresponding property, and different semantic-lacking element have different properties. The property of the semantic-lacking element defines a property of the corresponding element used to fill the semantic-lacking element. That is, only the portion of the initial request message, which meets the requirements of the property of the semantic-lacking element, can be filled into the semantic-lacking element, so as to form the specific semantic expression.

For example, in some embodiments, the abstract semantic expression stored in the abstract semantic database includes: through [concept1] [action] [concept2] ($ how) transact; through [concept] transact ($ how)transact; [concept2] ($ how) through [concept1] transact; ($ how) through [concept] transact; through [concept] ($ how) transact; through [concept1] ($ how) transact [concept2]; through [concept] [action] ($ how) transact; [concept2] through [concept1] ($ how) transact; through [concept1] ($ how) open [concept2]; through [concept1] ($ how) [action] [concept2]; [action1] [concept1] ($ how) [action2] [concept2]; [action1] [concept1] ($ how) [action2] [concept2]; where can [action] [concept]; [action] [concept] step; [concept1] [action] [concept2].

In above semantic expressions, "[ ]" represents the semantic-lacking element, and content of "[ ]" represents the property of the semantic-lacking element. Other elements of the semantic expressions represent the semantic rule word. Specifically, in the above expressions, "[concept]," "[concept1]," "[concept2]," "[action]," "[action1]," "[action2]" represent the semantic-lacking elements. Content of "[ ]," "concept," "concept1," "concept2," "action," "action1," "action2" represents the properties of the corresponding semantic-lacking elements. Wherein, "concept" indicates the semantic-lacking element [concept] is a semantic-lacking element having a concept property. The element used to fill this semantic-lacking element in subsequent step at least includes a single word having noun property from the initial request message, or includes a combination of a single word having noun property from the initial request message and one or more single word having other word property. "concept1" represents the semantic-lacking element "[concept1]" is the first semantic-lacking element having a concept property, wherein a combination of "concept" and "1" represents the property of the semantic-lacking element, "concept" represents the concept property, and "1" represents the location property, namely, the first. Subsequently, the element used to fill this semantic-lacking element at least includes the first single word having noun property from the initial request message, or includes a combination of the first single word having noun property from the initial request message and one or more single word having other word property. "concept2" represents the semantic-lacking element "[concept2]" is the second semantic-lacking element having a concept property. Subsequently, the element used to fill this semantic-lacking element at least includes the second single word having noun property from the initial request message, or includes a combination of the second single word having noun property from the initial request message and one or more single word having other word property. "action" represents the semantic-lacking element "[action]" is a semantic-lacking element having an action property. Subsequently, the element used to fill this semantic-lacking element at least includes a single word having action property from the initial request message, or includes a combination of the single word having action property from the initial request message and one or more single words having other word property. "action1" represents the semantic-lacking element "[action1]" is the first semantic-lacking element having an action property. Subsequently, the element used to fill this semantic-lacking element at least includes the first single word having action property from the initial request message, or includes a combination of the first single word having action property from the initial request message and one or more single words having other word property. "action2" represents the semantic-lacking element "[action2]" is the second semantic-lacking element having an action property. Subsequently, the element used to fill this semantic-lacking element at least includes the second single word having action property from the initial request message, or includes a combination of the second single word having action property from the initial request message and one or more single words having other word property.

Except the semantic-lacking elements, other elements of the semantic expression, such as "through," "($ how)," "transact," "open," "step," etc., represents semantic rule words, wherein the semantic rule word "($ how)" represents the semantic rule word "how" belongs to a wordclass "$ how." In one embodiment, the wordclass "$ how" includes keywords: "how," "what," "how about," "what about." The wordclass can be established at a same time as the abstract semantic expression. Correspondingly, the semantic rule word "through" belongs to a wordclass "$ through." In one embodiment, the wordclass "$ open" includes keywords: "open," "transact," "order," "apply." Subsequently, when the semantic-lacking element is filled to form the specific semantic expression, a semantic rule word in a wordclass can be replaced by other keywords in the same wordclass.

In above semantic expressions, the semantic expression "[concept1] [action] [concept2]" is defined as a default set.

It should be noted that, the expressions of the semantic-lacking element in the abstract semantic expression and the expressions of the wordclass information are used to facilitate the description of the embodiments, and are taken as examples. The scope of the present disclosure is not limited therein. In other embodiments of the present disclosure, the semantic-lacking element in the abstract semantic expression and the wordclass information can be expressed in other forms.

Referring back to FIG. 5, at step 504, intelligent-knowledge-base constructing device 104 performs an abstract semantic recommending process on the initial request message based on the abstract semantic database, so as to obtain one or more abstract semantic expressions corresponding to the initial request message.

The aim of the abstract semantic recommending process is to select one or more abstract semantic expressions corresponding to the initial request message from the abstract semantic database, such that a portion of the initial request message can be filled in a corresponding semantic-lacking element of the one or more abstract semantic expressions to obtain one or more specific semantic expressions. The one or more specific semantic expressions have a same or similar meaning as the initial request message. Subsequently, the obtained one or more specific semantic expressions and their corresponding initial request message may be stored into the intelligent knowledge base, such that the user only needs to input one initial request message. The method of the present disclosure can extend the initial request message automatically to obtain several messages (one or more specific semantic expressions) corresponding to the initial request message, which may be stored in the intelligent knowledge base subsequently. Therefore, the efficiency for establishing the intelligent knowledge base can be further improved.

In one embodiment, the initial request message may be used as the standard question, and the specific semantic expressions may be used as the corresponding extended questions. When the initial request message is stored into the intelligent knowledge base, an answer corresponding to the initial request message is provided, and is stored into the intelligent knowledge base together. Thus, a knowledge point can be formed in the intelligent knowledge base, and the knowledge point may be continually updated and optimized in subsequent steps.

Figure 6:
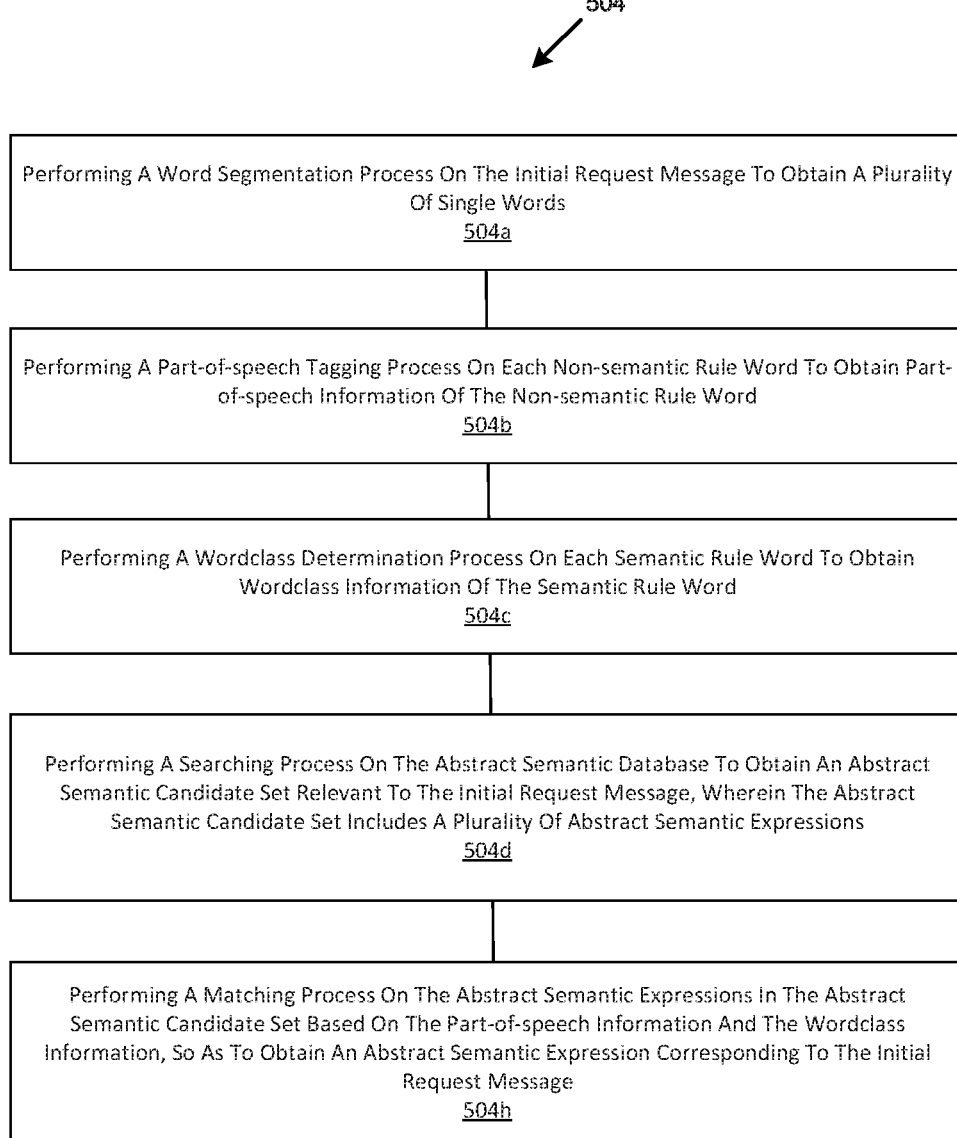
FIG. 6 illustrates a flow chart of an exemplary embodiment of an abstract semantic recommending process according to embodiments of the present disclosure.

FIG. 6 illustrates a flow chart of an exemplary embodiment of an abstract semantic recommending process 504 of FIG. 5, according to embodiments of the present disclosure. As shown in FIG. 6, in some embodiments, step 504 may include five sub-steps 504a-504d and 504h.

At step 504a, intelligent-knowledge-base constructing device 104 performs a word segmentation process on the initial request message to obtain one or more single words. In some embodiments, the same word segmentation process may be performed at step 406 once the initial request message is received. In that case, there is no need to repeat the word segmentation process at step 504, and the result of the word segmentation process step 406 can be directly used. In other embodiments, the word segmentation process at step 406 and the word segmentation process at step 504 are different. That is, when step 504 is performed, a word segmentation process may be performed on the initial request message again.

For example, when receive message "how to open a credit card through online banking" as an initial request message, intelligent-knowledge-base constructing device 104 performs a word segmentation process as follows. After a word segmentation process is performed on this initial request message, one or more single words can be obtained, such as "through," "online banking," "how," "open," and "credit card."

At step 504b, intelligent-knowledge-base constructing device 104 performs a part-of-speech tagging process on each of those single words, to obtain part-of-speech information of each single word. The aim of the part-of-speech tagging process performed on the single word is to obtain property information of each single word, and to provide a basis for a matching process performed on the inputted initial request message and the abstract semantic expressions in subsequent steps.

Specifically, in some embodiments, the part-of-speech of the single word "through" is marked as a first verb or a preposition, the part-of-speech of the single word "online banking" is marked as a first noun, the part-of-speech of the single word "how" is marked as a pronoun, the part-of-speech of the single word "open" is marked as a second verb, and the part-of-speech of the single word "credit card" is marked as a second noun. It should be noted that, the first noun marked by the part-of-speech tagging process means the single word "online bank" is the first noun having a noun word property, which is similar to the explanation of the second noun, the first verb and the second verb.

In another embodiment, the part-of-speech of the single word "through" is marked as a verb or a preposition, the part-of-speech of the single word "online banking" is marked as a first noun, the part-of-speech of the single word "how" is marked as a pronoun, the part-of-speech of the single word "open" is marked as a verb, and the part-of-speech of the single word "credit card" is marked as a second noun.

In the part-of-speech tagging process, the context of the semantic environment should be considered, so as to improve the accuracy of the part-of-speech tagging process.

At step 504c, intelligent-knowledge-base constructing device 104 performs a wordclass determination process on each single word, so as to obtain the wordclass information of each single word. The aim of performing the wordclass determination process on each single word is to determine whether each single word has a corresponding wordclass. In some embodiments, the wordclass determination process may include: matching each single word with a plurality of wordclasses in a wordclass library; if the single word exists in a wordclass, determining the single word belonging to the wordclass; and marking the single word to indicate the single word belonging to the wordclass (or word information). In the subsequent matching process, by determining whether a part of the content of the initial request message and a corresponding semantic rule word of the abstract semantic expression belong to a same wordclass, a matching degree of the initial request message and the abstract semantic expression is determined. Therefore, the accuracy and the efficiency of the matching process are improved.

For example, a wordclass determination process is performed on the single words "through," "online banking," "how," "open," and "credit card." Based on the determination, the single word "how" has a corresponding wordclass "Show." The wordclass "Show" includes keywords: "how," "what," "how about," "what about." A marking process indicating the single word "how" belonging to the wordclass "Show" is performed. The single word "open" has a corresponding wordclass "$open." The wordclass "$open" includes keywords: "open," "transact," "order," "apply." In the subsequent step for filling the semantic-lacking element to obtain specific semantic expressions, if a single word having a wordclass is filled to the semantic-lacking element, other keywords of the wordclass may be used to replace the single word and to fill the corresponding semantic-lacking element.

At step 504d, intelligent-knowledge-base constructing device 104 performs a searching process on the abstract semantic database to obtain an abstract semantic candidate set relevant to the initial request message. The abstract semantic candidate set includes a plurality of abstract semantic expressions. The aim of performing the searching process on the abstract semantic database to obtain an abstract semantic candidate set relevant to the initial request message, is to reduce the burden of the subsequent matching process, reduce the processing time, and improve the system performance.

At least parts of semantic rule words of the abstract semantic expressions in the abstract semantic candidate set are the same, or belong to a same wordclass, as parts of the single words of the initial request message. In one embodiment, the searching process is performed to determine whether at least parts of semantic rule words of the abstract semantic expressions in the abstract semantic database are the same, or belong to a same wordclass, as at least parts of single words of the initial request message. If at least parts of semantic rule words of an abstract semantic expression are the same, or belong to a same wordclass as at least parts of single words of the initial request message, the abstract semantic expression is determined to be one abstract semantic expression of the abstract semantic candidate set. In other embodiments, other searching methods may be used to search the abstract semantic database to obtain the abstract semantic candidate set relevant to the initial request message.

For example, a searching process is performed on the abstract semantic database to obtain an abstract semantic candidate set relevant to the initial request message: "how to open a credit card through online banking." The abstract semantic candidate set includes abstract semantic expressions: through [concept1] [action] [concept2] ($how) transact; through [concept] transact ($how) transact; [concept2] ($how) through [concept1] transact; ($how) through [concept] transact; through [concept] ($how) transact; through [concept1] ($how) transact [concept2]; through [concept1] ($how) open [concept2]; through [concept] [action] ($how) transact; through [concept1] ($how) open [concept2]; [concept2] through [concept1] ($how) transact; through [concept1] ($how) [action] [concept2]; [action1] [concept1] ($how) [action2] [concept2]; [action1] [concept1] ($how) [action2] [concept2]. Parts of semantic rule words (through, through, transact or ($how)) of the abstract semantic expressions in the above abstract semantic candidate set are the same, or belong to a same wordclass as at least parts of the single words (through, transact or how) of the initial request message.

At step 504h, intelligent-knowledge-base constructing device 104 performs a matching process on the abstract semantic expressions in the abstract semantic candidate set based on the part-of-speech information and the wordclass information, so as to obtain an abstract semantic expression corresponding to the initial request message.

In some embodiments, the abstract semantic expression corresponding to the initial request message satisfies the following conditions: the part-of-speech (or property) corresponding to the semantic-lacking element includes the part-of-speech of the corresponding filling element; keywords of the initial request message except the filling element are the same or belong to a same wordclass as the semantic rule words; the abstract semantic expression has a same order as the initial request message. The matching process is performed based on above conditions. If one abstract semantic expression of the abstract semantic candidate set satisfies all the three conditions, the abstract semantic expression is an abstract semantic expression corresponding to the initial request message. That is, in the matching process, whether an abstract semantic expression is the abstract semantic expression corresponding to the initial request message is determined based on the above conditions.

In other embodiments, the abstract semantic expression corresponding to the initial request message may only satisfy one or two above conditions. Specifically, the abstract semantic expression corresponding to the initial request message satisfies the following condition: the part-of-speech (or property) corresponding to the semantic-lacking element includes the part-of-speech of the corresponding filling element; or the abstract semantic expression corresponding to the initial request message satisfies the following conditions: the part-of-speech (or property) corresponding to the semantic-lacking element includes the part-of-speech of the corresponding filling element, and keywords of the initial request message except the filling element are the same or belong to a same wordclass as the semantic rule words; or the abstract semantic expression corresponding to the initial request message satisfies the following conditions: the part-of-speech (or property) corresponding to the semantic-lacking element includes the part-of-speech of the corresponding filling element; and the abstract semantic expression has a same order as the initial request message.

For example, the abstract semantic expression, obtained through the matching processing and being corresponding to the initial request message "how to open a credit card through online banking", includes: through [concept1] ($how) [action] [concept2]. The semantic-lacking element [concept1] of the abstract semantic expression is corresponding to the single word "online banking", the semantic-lacking element [action] is corresponding to the single word "open", the semantic-lacking element [concept2] is corresponding to the single word "credit card", and the semantic-lacking element [action2] is corresponding to the single word "open". In another abstract semantic expression [concept1] ($how) open [concept2], the semantic-lacking element [concept1] is corresponding to the single word "online banking", and the semantic-lacking element [concept2] is corresponding to the single word "credit card".

In other embodiments, if the abstract semantic expression corresponding to the initial request message cannot be obtained, extended questions corresponding to the initial request message can be manually filled into the intelligent knowledge base.

Figure 7:
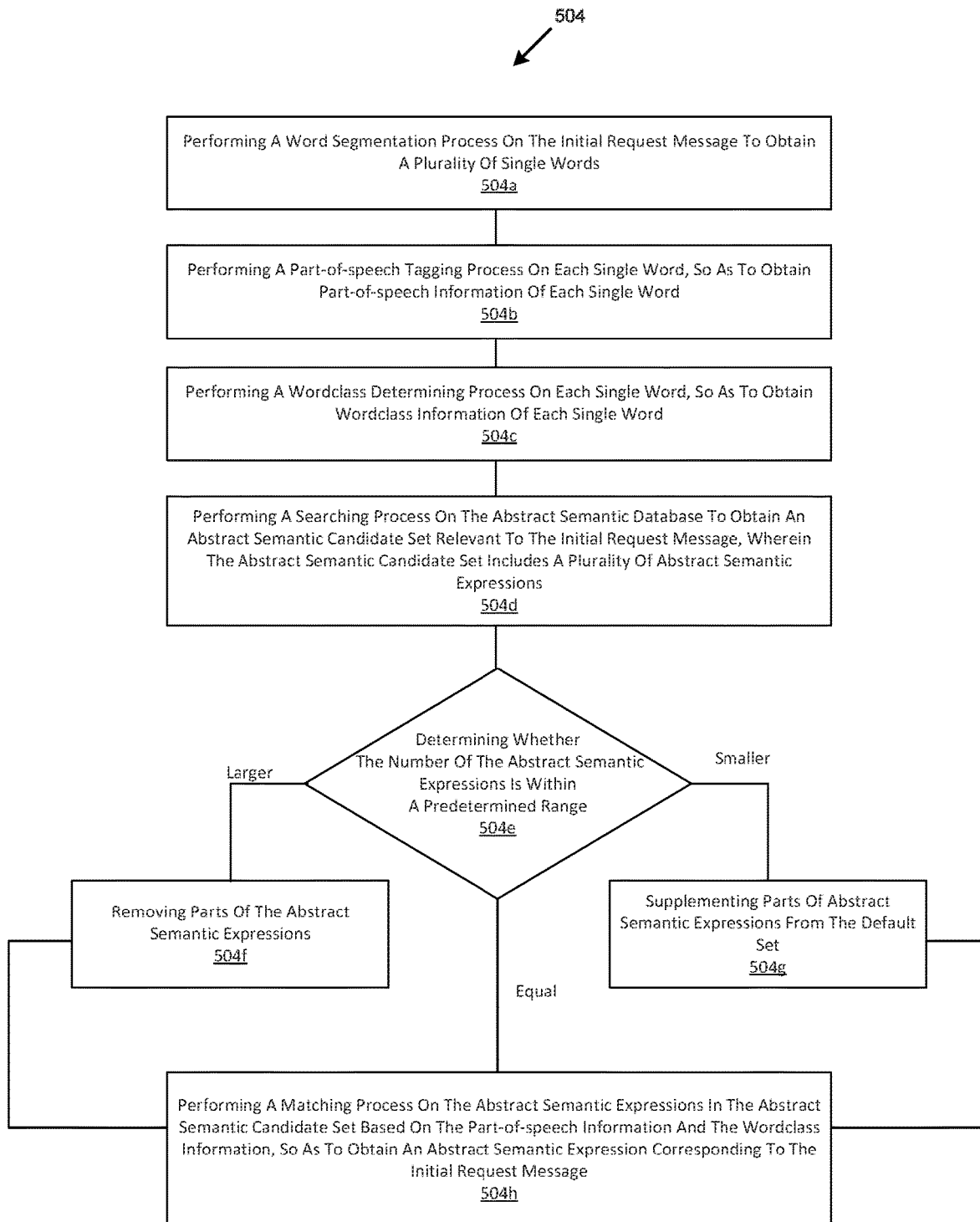
FIG. 7 illustrates a flow chart of another exemplary embodiment of an abstract semantic recommending process according to embodiments of the present disclosure.

FIG. 7 illustrates a flow chart of another exemplary embodiment of an abstract semantic recommending process 504 of FIG. 5, according to embodiments of the present disclosure. As shown in FIG. 7, in some embodiments, step 504 may further include sub-steps 504e, 504f, and 504g, in addition to sub-steps 504a through 504d and 504h as disclosed in FIG. 6. In FIG. 7, after intelligent-knowledge-base constructing device 104 performs step 504d and before performing step 504h, it performs steps 504e, 504f, and 504g. The aim of this embodiment is to prevent obtaining too many or too few abstract semantic expressions.

Steps 504e, 504f, and 504g will be described in detail below. The detailed description of steps 504a through 504d and 504h is provided above and is not repeated here.

After intelligent-knowledge-base constructing device 104 performs a searching process on the abstract semantic database to obtain an abstract semantic candidate set, which is relevant to the initial request message and includes a plurality of abstract semantic expressions, device 104 performs step 504e to determine whether the number of the abstract semantic expressions in the abstract semantic candidate set is within a predetermined range. When the number of the abstract semantic expressions in the abstract semantic candidate set is above the predetermined range, step 504f is performed to remove parts of the abstract semantic expressions. When the number of the abstract semantic expressions in the abstract semantic candidate set is under the predetermined range, step 504g is performed to supplement parts of abstract semantic expressions from the default set. When the number of the abstract semantic expressions in the abstract semantic candidate set is within the predetermined range, step 504h is performed to perform a matching process on the abstract semantic expressions in the abstract semantic candidate set based on the word properties and the wordclasses, to obtain an abstract semantic expression corresponding to the initial request message.

The predetermined range may be preconfigured. The predetermined range may be a specific value or a value range.

When the number of the abstract semantic expressions in the abstract semantic candidate set is above the predetermined range, parts of the abstract semantic expressions are removed, and then the remaining abstract semantic expressions in the abstract semantic candidate set are used in the subsequent step 504h. In one embodiment, parts of the abstract semantic expressions may be randomly removed, or may be removed according to a certain rule. For example, the abstract semantic expressions having odd serial numbers (or even serial numbers) may be removed, or one or more abstract semantic expressions are removed with an interval of a predetermined number of abstract semantic expressions.

When the number of the abstract semantic expressions in the abstract semantic candidate set is under the predetermined range, parts of abstract semantic expressions from the default set is supplemented to the abstract semantic candidate set. Then the abstract semantic candidate set supplemented with the parts of abstract semantic expressions from the default set is used in the subsequent step 504h.

Figure 8:
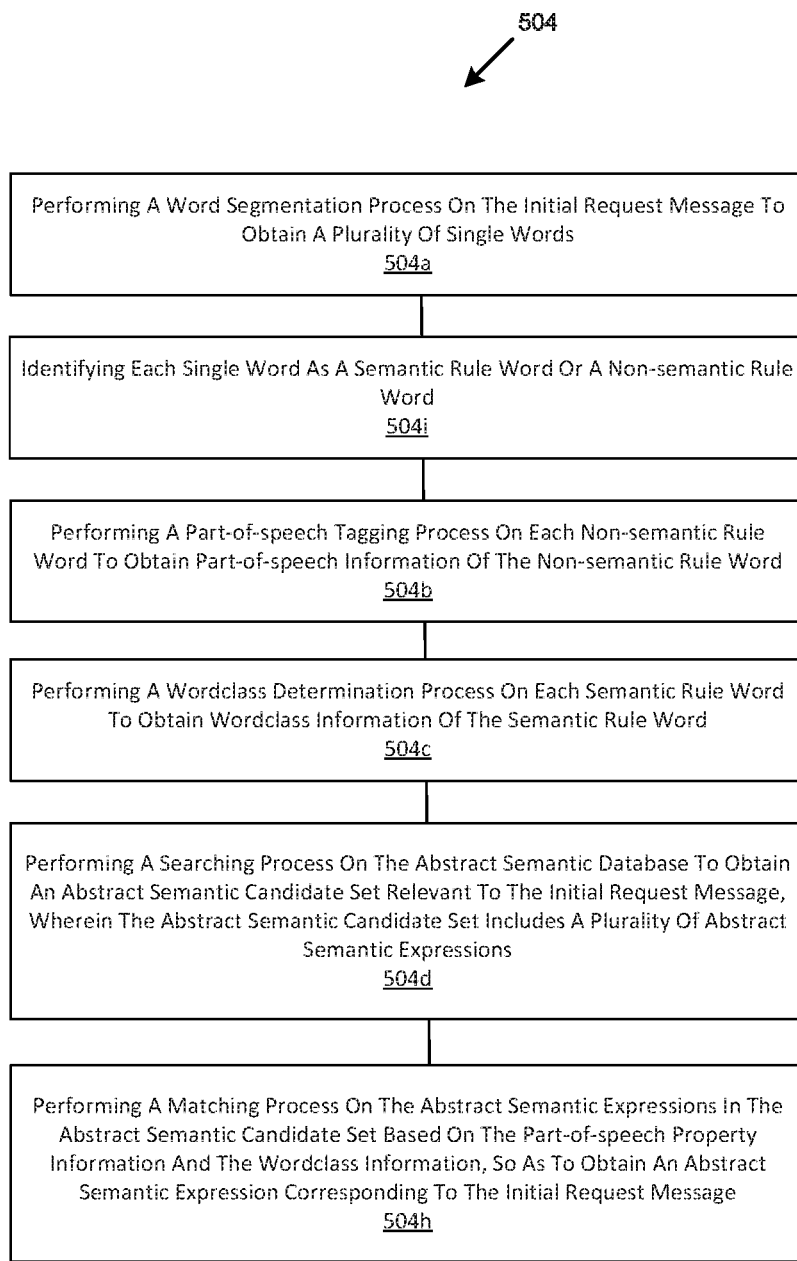
FIG. 8 illustrates a flow chart of yet another exemplary embodiment of an abstract semantic recommending process according to embodiments of the present disclosure.

FIG. 8 illustrates a flow chart of yet another exemplary embodiment of an abstract semantic recommending process 504 of FIG. 5, according to embodiments of the present disclosure. As shown in FIG. 8, in some embodiments, step 504 may further include sub-step 504i, in addition to sub-steps 504a through 504d and 504h as disclosed in FIG. 6.

Step 504i will be described in detail below. The detailed description of steps 504a through 504d and 504h are provided above and are not repeated here.

A difference between this embodiment disclosed in FIG. 8 and that embodiment disclosed in FIG. 6 is that, before the part-of-speech tagging process and the wordclass determination process, a step for identifying each single word as a semantic rule word or a non-semantic rule word is performed. Then, a part-of-speech tagging process is performed on each identified non-semantic rule word, and a wordclass determination process is performed on each identified semantic rule words. Thus, the targets of the part-of-speech tagging process and the wordclass determination process are respectively parts of the single words. Therefore, the processing time for the part-of-speech tagging process and the wordclass determination process is reduced, and the processing efficiency is improved.

At step 504i, intelligent-knowledge-base constructing device 104 identifies each single word as a semantic rule word or a non-semantic rule word. In some embodiments, a process for identifying a single word as a semantic rule word or a non-semantic rule word may include: providing a semantic rule word database including a plurality of semantic rule words; determining whether the one or more single words exist in the semantic rule word database; if a single word exists in the semantic rule word database, identifying the single word as a semantic rule word; and if a single word doesn't exist in the semantic rule word database, identifying the single word as a non-semantic rule word.

For example, the provided semantic rule word database includes a plurality of semantic rule words: "through," "how," "what," "what about," etc. An example of the initial request message is "how to open a credit card through online banking." A plurality of single words, "through," "online banking," "how," "open," and "credit card," can be obtained through the word segmentation process. It is determined whether the single words "through," "online banking," "how," "open," and "credit card" exist in the semantic rule word database. Based on the determination, the single word "how" exists in the semantic rule word database, such that the single word "how" is identified as a semantic rule word; the single word "through" exists in the semantic rule word database, such that the single word "through" is identified as a semantic rule word. However, the single words "online banking," "open," and "credit card" don't exist in the semantic rule word database, such that, the single words "online banking," "open," and "credit card" are identified as non-semantic rule word. In the subsequent wordclass determination process, the wordclass determination process is only performed on the semantic rule words "how" and "through" to obtain wordclass information of the semantic rule words "how" and "through." In the subsequent part-of-speech tagging process, the part-of-speech tagging process is only performed on the non-semantic rule words "online banking," "open," and "credit card" to obtain wordclass information of the non-semantic rule words "online banking," "open," and "credit card."

In some embodiments, after intelligent-knowledge-base constructing device 104 performs step 504d and before performing step 504h, it determines whether the number of the abstract semantic expressions in the abstract semantic candidate set is within a predetermined range. If the number of the abstract semantic expressions in the abstract semantic candidate set is above the predetermined range, intelligent-knowledge-base constructing device 104 removes parts of the abstract semantic expressions. If the number of the abstract semantic expressions in the abstract semantic candidate set is under the predetermined range, intelligent-knowledge-base constructing device 104 supplements parts of abstract semantic expressions from the default set.

Referring back to FIG. 5, at step 506, when intelligent-knowledge-base constructing device 104 obtains one or more abstract semantic expressions corresponding to the initial request message, it extracts an element corresponding to the semantic-lacking element of the one or more abstract semantic expressions from the initial request message. And device 104 fills the extracted element into the semantic-lacking element to obtain one or more specific semantic expressions corresponding to the initial request message.

For example, in some embodiments, abstract semantic expressions matching to the initial request message "how to open a credit card through online banking" may include:

through [concept1] ($how) [action] [concept2], wherein the single word "online banking" is extracted from the initial request message and is filled to the corresponding semantic-lacking element [concept1], the single word "open" is extracted from the initial request message and is filled to the corresponding semantic-lacking element [action], and the single word "credit card" is extracted from the initial request message and is filled to the corresponding semantic-lacking element [concept2], so as to form a specific semantic expression: through online banking ($how) ($open) credit card, and wherein ($how) indicates the semantic rule word "how" may be replaced by a key word: "what", "how about" or "what about", and ($open) indicates the single word "open" may be replaced by "transact", "order" or "apply";

[action1] [concept1] ($how) [action2] [concept2], wherein the single word "online banking" is extracted from the initial request message and is filled to the corresponding semantic-lacking element [concept1], the single word "through" is extracted from the initial request message and is filled to the corresponding semantic-lacking element [action1], the single word "credit card" is extracted from the initial request message and is filled to the corresponding semantic-lacking element [concept2], and the single word "open" is extracted from the initial request message and is filled to the corresponding semantic-lacking element [action2], so as to form a specific semantic expression: through online banking ($how) open credit card; and through [concept1] ($how) open [concept2], wherein the single word "online banking" is extracted from the initial request message and is filled to the corresponding semantic-lacking element [concept1], and the single word "credit card" is extracted from the initial request message and is filled to the corresponding semantic-lacking element [concept2], so as to form a specific semantic expression: through online banking ($how) open credit card.

In some embodiments, before step 506 is performed, if a number M of the abstract semantic expressions corresponding to the initial request message is larger than a number N of the specific semantic expressions which need to be stored in the intelligent knowledge base, intelligent-knowledge-base constructing device 104 further performs a scoring process on the abstract semantic expressions corresponding to the initial request message.

Figure 9:
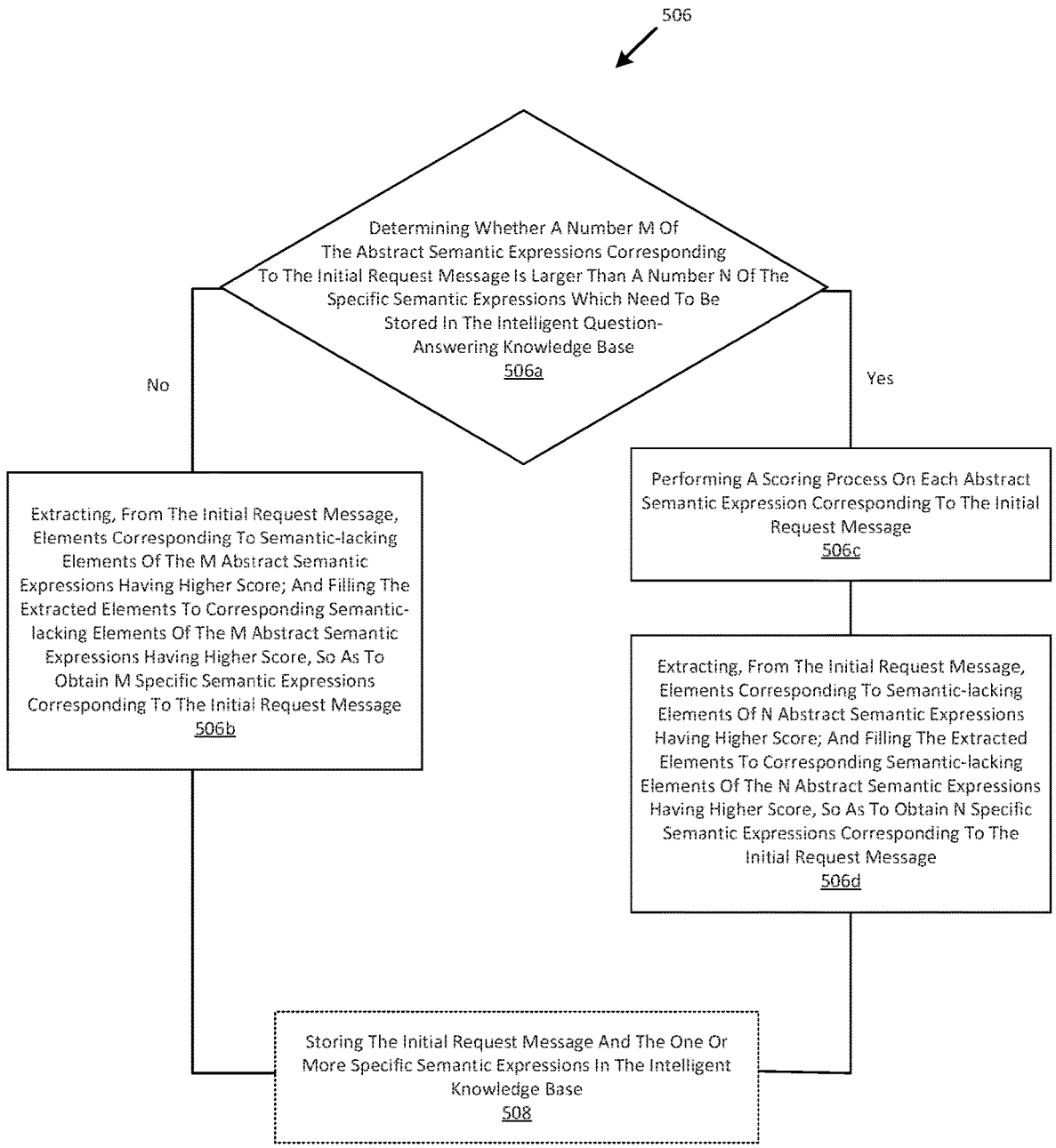
FIG. 9 illustrates a flow chart of an exemplary embodiment of a process for extracting from an initial request message an element corresponding to a semantic-lacking element of an abstract semantic expression, and filling the extracted element to the semantic-lacking element to obtain one or more specific semantic expressions corresponding to the initial request message, according to embodiments of the present disclosure.

FIG. 9 illustrates a flow chart of an exemplary embodiment of step 506 (of FIG. 5) for extracting from an initial request message an element corresponding to a semantic-lacking element of an abstract semantic expression, and filling the extracted element to the semantic-lacking element to obtain one or more specific semantic expressions corresponding to the initial request message, according to embodiments of the present disclosure. As shown in FIG. 9, step 506 includes sub-steps 506a through 506d.

At step 506a, intelligent-knowledge-base constructing device 104 determines whether a number M of the abstract semantic expressions corresponding to the initial request message is larger than a number N of the specific semantic expressions which need to be stored in the intelligent knowledge base. If the number M of the abstract semantic expressions corresponding to the initial request message is greater than the number N of the specific semantic expressions that need to be stored in the intelligent knowledge base, device 104 performs step 506c. If the number M of the abstract semantic expressions corresponding to the initial request message is smaller than the number N of the specific semantic expressions which need to be stored in the intelligent knowledge base, device 104 performs step 506b.

At step 506c, intelligent-knowledge-base constructing device 104 performs a scoring process on each abstract semantic expression corresponding to the initial request message, and then proceeds to step 506d.

At step 506d, intelligent-knowledge-base constructing device 104 extracts, from the initial request message, elements corresponding to semantic-lacking elements of N abstract semantic expressions having higher score. It then fills the extracted elements into corresponding semantic-lacking elements of the N abstract semantic expressions having higher score, so as to obtain N specific semantic expressions corresponding to the initial request message. Afterwards, device 104 proceeds to step 508.

At step 506b, intelligent-knowledge-base constructing device 104 extracts, from the initial request message, elements corresponding to semantic-lacking elements of the M abstract semantic expressions having higher score. And device 104 then fills the extracted elements into corresponding semantic-lacking elements of the M abstract semantic expressions having higher score, so as to obtain M specific semantic expressions corresponding to the initial request message. Afterwards, device 104 proceeds to step 508.

It should be noted that, when the number M of the abstract semantic expressions corresponding to the initial request message is equal to the number N of the specific semantic expressions which need to be stored in the intelligent knowledge base, either step 506b or step 506c may be performed.

The aim to perform the scoring process at step 506c is to store a predetermined number of specific semantic expressions, which are best matched to the initial request message, into the intelligent knowledge base. In some embodiments, intelligent-knowledge-base constructing device 104 may employ one method or a combination of more than one method described below to perform the scoring process.

Method one: intelligent-knowledge-base constructing device 104 sets a higher score to the abstract semantic expression if the number of the matched semantic-lacking elements is higher.

For example, through the matching process, an abstract semantic expression corresponding to the initial request message "how to open a credit card through online banking" can be obtained. The abstract semantic expression is: through [concept1] ($how) [action] [concept2], wherein the semantic-lacking element [concept1] in the abstract semantic expression corresponds to the single word "online banking," the semantic-lacking element [action] corresponds to the single word "open," and the semantic-lacking element [concept2] corresponds to the single word "credit card." That is, each semantic-lacking element has a corresponding filling element. Therefore, this number of the matched semantic-lacking elements of this abstract semantic expression is large, and the score of the abstract semantic expression is high.

Method two: intelligent-knowledge-base constructing device 104 defines a semantic-lacking element of the abstract semantic expression as a core semantic element. Device 104 sets a higher score to the abstract semantic expression if the semantic-lacking element is more close to the core semantic element.

For example, through the matching process, an abstract semantic expression corresponding to the initial request message "how to open a credit card through online banking" can be obtained. The abstract semantic expression includes: a first abstract semantic expression: through [concept1]

($how) [action] [concept2], and a second abstract semantic expression: [action1] [concept1] ($how) [action2] [concept2].

The semantic-lacking element [concept2] is defined as a core semantic element. Because a distance from the semantic-lacking element [action1] to the core semantic element [concept2] in the second abstract semantic expression is larger than a distance from the semantic-lacking element [action1] to the core semantic element [concept2] in the first abstract semantic expression, a score of the semantic-lacking element [action1] in the first abstract semantic expression is greater than that in the second abstract semantic expression.

Method three: intelligent-knowledge-base constructing device 104 sets a higher score to the abstract semantic expression if the confidence value of the part-of-speech is higher. When a content constituted by one or more single words is filled into a corresponding semantic-lacking element of the abstract semantic expression, if a single word of the filling content is a word having service property, the abstract semantic expression has a higher score.

In one embodiment, when a content constituted by at least two single words is filled into a corresponding semantic-lacking element of the abstract semantic expression, if the single word at the end of the content has business property, the abstract semantic expression has a higher score.

For example, if the content filled into a corresponding semantic-lacking element of the abstract semantic expression is "personal credit card," the content is constituted by two single words, "personal" and "credit card." The single word at the end of "personal credit card" is "credit card," and the single word "credit card" is a word having business property, thus the abstract semantic expression has a higher score.

Method four: intelligent-knowledge-base constructing device 104 sets a higher score to the abstract semantic expression if a priority level is higher, wherein the priority level is pre-assigned to the abstract semantic expression.

In the process for establishing the abstract semantic database, parts of the abstract semantic expressions in the abstract semantic database are assigned with a higher priority level. In the matching process, if the abstract semantic expression having a higher priority level is obtained, the abstract semantic expression having a higher priority level may has a higher score.

For example, in the process for establishing the abstract semantic database, the abstract semantic expression "through [concept1] ($how) [action] [concept2]" is assigned a higher priority level. In a specific embodiment, the abstract semantic expression is marked with a mark. The mark indicates the abstract semantic expression has a higher priority level, or indicates the priority level of the abstract semantic expression.

Based on the matching process, an abstract semantic expression corresponding to the initial request message "how to open a credit card through online banking" is obtained. The abstract semantic expression is "through [concept1] ($how) [action] [concept2]." As the abstract semantic expression has a higher priority level, the abstract semantic expression has a higher score.

Method five: intelligent-knowledge-base constructing device 104 sets a higher score to the abstract semantic expression if a probability is higher. The probability is determined based on a natural language model, and corresponds to whether data information obtained by filling segmentation words of a large amount of crawled corpus data into the abstract semantic expression has correct semantic information.

Referring back to FIG. 5, at step 508, intelligent-knowledge-base constructing device 104 stores the initial request message and the one or more specific semantic expressions into the intelligent knowledge base.

In some embodiments, when the initial request message and the specific semantic expressions are stored into the intelligent knowledge base, the initial request message may be stored as a standard question, and the specific semantic expressions may be stored as extended questions of the standard question. Besides, when the initial request message and the specific semantic expressions are stored in the intelligent knowledge base, an answer corresponds to the initial request message is provided, and the answer is also stored in the intelligent knowledge base. The answer corresponding to the initial request message may be provided by a user.

Based on different configurations of the embodiment, maybe the specific semantic expression having the highest score and its corresponding initial request message are stored in the intelligent knowledge base, or maybe a plurality of specific semantic expression having higher score and the corresponding initial request message are stored in the intelligent knowledge base.

Figure 10:
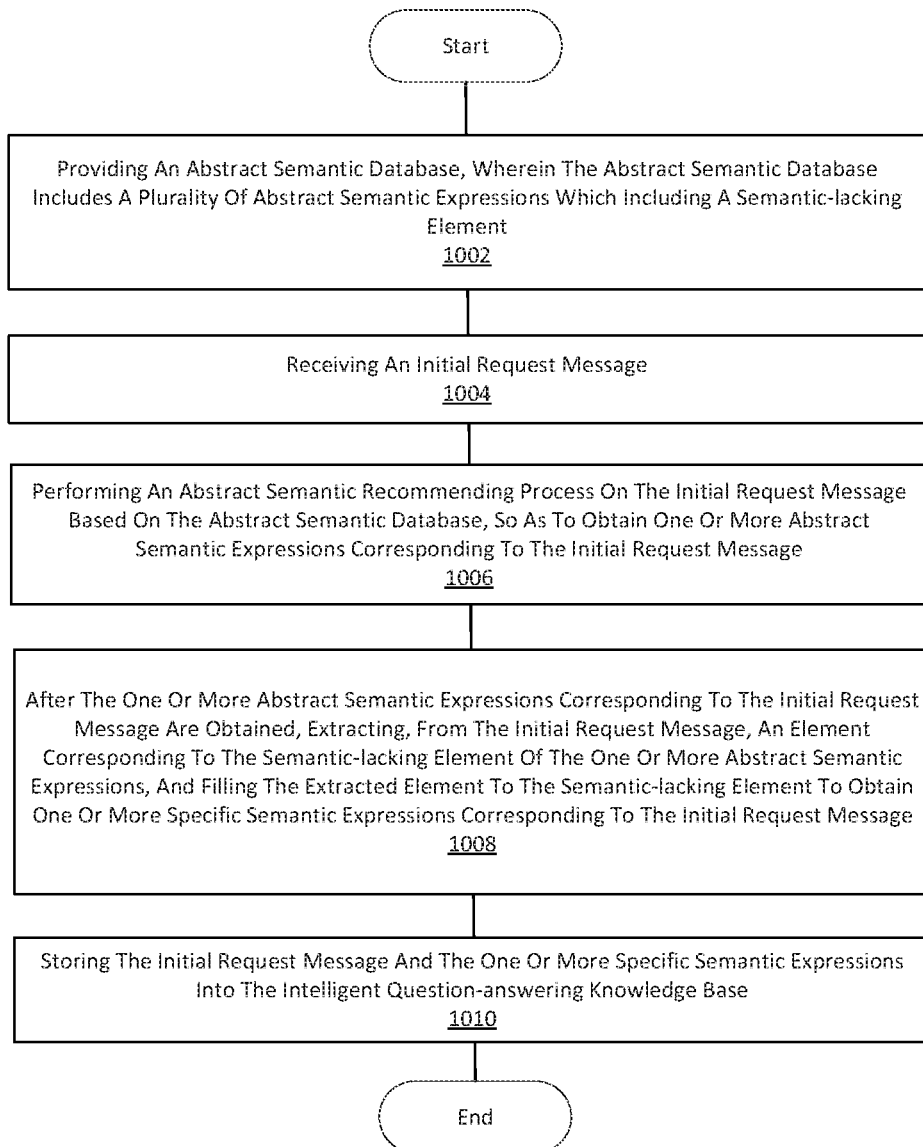
FIG. 10 illustrates a flow chart of an exemplary method for constructing an intelligent knowledge base based on abstract semantic recommendation, according to embodiments of the present disclosure.

FIG. 10 illustrates a flow chart of an exemplary method for constructing an intelligent knowledge base based on abstract semantic recommendation, according to embodiments of the present disclosure. Specifically, at step 1002, an abstract semantic database such as database 110 is provided. The abstract semantic database includes a plurality of abstract semantic expressions, each of which includes a semantic-lacking element. Intelligent-knowledge-base constructing device 104 obtains a plurality of abstract semantic expressions from the abstract semantic database. At step 1004, device 104 receives an initial request message. At step 1006, device 104 performs an abstract semantic recommending process on the initial request message based on the abstract semantic database, so as to obtain one or more abstract semantic expressions corresponding to the initial request message. At step 1008, after the one or more abstract semantic expressions corresponding to the initial request message are obtained, device 104 extracts, from the initial request message, an element corresponding to the semantic-lacking element of the one or more abstract semantic expressions. And device 104 fills the extracted element into the semantic-lacking element to obtain one or more specific semantic expressions corresponding to the initial request message. At step 1010, device 104 stores the initial request message and the one or more specific semantic expressions into the intelligent knowledge base. The steps similar to steps 1002 through 1010 are described in detail above.

It will now be appreciated by one of ordinary skill in the art that the illustrated methods can be altered to delete steps, change the order of steps, or include additional steps. The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, single central processing unit (CPU) chip, a CPU chip combined on a motherboard, a general purpose computer, or any other combination of devices or modules capable of constructing an intelligent knowledge base such as a question-answer knowledge base based on semantic similarity calculation and/or abstract semantic recommendation disclosed herein.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A device for constructing an intelligent knowledge base, comprising:
   an abstract semantic expression obtaining unit to obtain a plurality of abstract semantic expressions from an abstract semantic database, wherein each of the plurality of abstract semantic expressions comprises a semantic-lacking element;
   a receiving unit to receive an initial request message;
   an abstract semantic recommending module, coupled to the abstract semantic expression obtaining unit and the receiving unit, to obtain one or more abstract semantic expressions corresponding to the initial request message by performing an abstract semantic recommending process on the initial request message based on the plurality of abstract semantic expressions;
   a filling unit, coupled to the abstract semantic recommending module, to extract from the initial request message an element corresponding to a semantic-lacking element of the obtained one or more abstract semantic expressions, and to fill the extracted element into the semantic-lacking element to obtain one or more specific semantic expressions corresponding to the initial request message;
   a storing unit to store the initial request message and the one or more specific semantic expressions into the intelligent knowledge base; and
   wherein the abstract semantic recommending module comprises:
      a word segmentation unit to perform a word segmentation process on the initial request message to obtain one or more single words;
      a part-of-speech tagging unit to perform a part-of-speech tagging process on each of the one or more single words to obtain part-of-speech information of each of the one or more single words;
      a wordclass determination unit to perform a wordclass determination process on each of the one or more single words to obtain its wordclass information;
      a searching unit to perform a searching process on the obtained one or more abstract semantic expressions to acquire an abstract semantic candidate set relevant to the initial request message, wherein the abstract semantic candidate set comprises several abstract semantic expressions; and
      a matching unit to derive an abstract semantic expression corresponding to the initial request message by performing a matching process on the several abstract semantic expressions in the abstract semantic candidate set based on the part-of-speech information and the wordclass information.

2. The device according to claim 1, wherein the abstract semantic recommending module further comprises:
   a rule word identification unit to identify each of the one or more single words as a semantic rule word or a non-semantic rule word;
   the part-of-speech tagging unit to perform the part-of-speech tagging process on the non-semantic rule word of each of the one or more single words to obtain part-of-speech information of the non-semantic rule word; and
   the wordclass determination unit to perform the wordclass determination process on the semantic rule word of each of the one or more single words to obtain wordclass information of the semantic rule word.

3. The device according to claim 2, wherein:
   the derived abstract semantic expression comprises a semantic rule word; and
   at least one of semantic rule words of the several abstract semantic expressions in the abstract semantic candidate set is the same or belongs to a same wordclass as one of the single words of the initial request message.

4. The device according to claim 3, wherein the derived abstract semantic expression corresponding to the initial request message satisfies the following conditions:
   a part-of-speech corresponding to the semantic-lacking element comprises a part-of-speech of the filling element;
   a keyword of the initial request message except the filling element is the same or belongs to a same wordclass as the semantic rule word of the derived abstract semantic expression; and
   the derived abstract semantic expression has a same order as the initial request message.

5. The device according to claim 1, wherein the abstract semantic recommending module further comprises:
   a number determination unit to determine, before the matching process, whether a number of the several abstract semantic expressions in the abstract semantic candidate set is within a predetermined range;
   a removing unit to remove, when the number of the several abstract semantic expressions in the abstract semantic candidate set is above the predetermined range, one or more of the several abstract semantic expressions; and
   a supplementing unit to supplement, when the number of the several abstract semantic expressions in the abstract semantic candidate set is under the predetermined range, one or more of abstract semantic expressions from a default set.

6. The device according to claim 1, further comprising:
   a scoring unit to:
      when a number M of the obtained one or more abstract semantic expressions corresponding to the initial request message is greater than a number N of the obtained one or more specific semantic expressions, perform a scoring process on each abstract semantic expression corresponding to the initial request message;

wherein the filling unit further:
fills the extracted element into semantic-lacking elements of the N abstract semantic expressions having higher scores; and
obtains N specific semantic expressions corresponding to the initial request message.

7. The device according to claim 6, wherein the scoring unit performs a scoring process according to one or more methods selected from a group comprising:
setting a higher score to an abstract semantic expression corresponding to the initial request message if a number of the matched semantic-lacking elements is higher;
defining a semantic-lacking element of the abstract semantic expression as a core semantic element, and setting a higher score to an abstract semantic expression if its semantic-lacking element is closer to the core semantic element;
setting a higher score to an abstract semantic expression if a confidence value of its part-of-speech is higher;
setting a higher score to an abstract semantic expression if a priority level is higher, wherein the priority level is pre-assigned to the abstract semantic expression; and/or
setting a higher score to an abstract semantic expression if a probability is higher, wherein the probability is determined based on a natural language model, and corresponds to whether data information obtained by filling segmentation words of a large amount of crawled corpus data into the abstract semantic expression has correct semantic information.

8. The device according to claim 1, further comprising:
an answer providing unit to provide an answer corresponding to the initial request message, wherein the storing unit stores the initial request message along with the provided answer into the intelligent knowledge base.

9. A computer-implemented method for constructing an intelligent knowledge base, comprising:
providing an abstract semantic database, wherein the abstract semantic database comprises a plurality of abstract semantic expressions and each of the plurality of abstract semantic expressions comprises a semantic-lacking element;
receiving, via an intelligent-knowledge-base constructing device, an initial request message, which needs an abstract semantic recommendation;
performing an abstract semantic recommending process on the initial request message based on the abstract semantic database;
obtaining, via the intelligent-knowledge-base constructing device, one or more abstract semantic expressions corresponding to the initial request message;
extracting, from the initial request message, an element corresponding to a semantic-lacking element of the one or more abstract semantic expressions;
filling the extracted element into the semantic-lacking element of the one or more abstract semantic expressions to obtain one or more specific semantic expressions corresponding to the initial request message;
storing the initial request message and the one or more specific semantic expressions into the intelligent knowledge base; and
wherein the abstract semantic recommending process comprises:

performing a word segmentation process on the initial request message to obtain one or more single words;
performing a part-of-speech tagging process on each single word to obtain part-of-speech information of the each single word;
performing a wordclass determination process on each single word to obtain wordclass information of the each single word;
performing a searching process on the abstract semantic database to obtain an abstract semantic candidate set relevant to the initial request message, wherein the abstract semantic candidate set comprises several abstract semantic expressions; and
deriving an abstract semantic expression corresponding to the initial request message by performing a matching process on the several abstract semantic expressions in the abstract semantic candidate set based on the part-of-speech information and the wordclass information.

10. The method according to claim 9, wherein the abstract semantic recommending process further comprises:
identifying each of the one or more single words as a semantic rule word or a non-semantic rule word;
performing the part-of-speech tagging process on the non-semantic rule word of each of the one or more single words to obtain part-of-speech information of the non-semantic rule word; and
performing the wordclass determination process on the semantic rule word of each of the one or more single words to obtain wordclass information of the semantic rule word.

11. The method according to claim 10, wherein:
the derived abstract semantic expression comprises a semantic rule word; and
at least one of semantic rule words of the several abstract semantic expressions in the abstract semantic candidate set is the same or belongs to a same wordclass as one of the single words of the initial request message.

12. The method according to claim 11, wherein the derived abstract semantic expression corresponding to the initial request message satisfies the following conditions:
a part-of-speech corresponding to the semantic-lacking element comprises a part-of-speech of the filling element;
a keyword of the initial request message except the filling element is the same or belongs to a same wordclass as the semantic rule word of the derived abstract semantic expression; and
the derived abstract semantic expression has a same order as the initial request message.

13. The method according to claim 9, further comprising:
determining, before the matching process, whether a number of the several abstract semantic expressions in the abstract semantic candidate set is within a predetermined range;
removing, when the number of the several abstract semantic expressions in the abstract semantic candidate set is above the predetermined range, one or more of the several abstract semantic expressions; and
supplementing, when the number of the several abstract semantic expressions in the abstract semantic candidate set is under the predetermined range, one or more of abstract semantic expressions from a default set.

14. The method according to claim 9, further comprising:
determining a number M of the obtained one or more abstract semantic expressions corresponding to the initial request message is greater than a number N of the specific semantic expressions;

performing, based on the determination, a scoring process on each abstract semantic expression corresponding to the initial request message;

extracting, from the initial request message, elements corresponding to semantic-lacking elements of N abstract semantic expressions having higher scores;

filling the extracted elements into the corresponding semantic-lacking elements of the N abstract semantic expressions having higher scores; and obtaining N specific semantic expressions corresponding to the initial request message.

15. The method according to claim 14, wherein the scoring process employs one or more methods selected from a group comprising:

setting a higher score to an abstract semantic expression corresponding to the initial request message if a number of the matched semantic-lacking elements is higher;

defining a semantic-lacking element of the abstract semantic expression as a core semantic element, and setting a higher score to an abstract semantic expression if its semantic-lacking element is closer to the core semantic element;

setting a higher score to an abstract semantic expression if a confidence value of its part-of-speech is higher;

setting a higher score to the abstract semantic expression if a priority level is higher, wherein the priority level is pre-assigned to the abstract semantic expression; and/or setting a higher score to an abstract semantic expression if a probability is higher, wherein the probability is determined based on a natural language model, and corresponds to whether data information obtained by filling segmentation words of a large amount of crawled corpus data into the abstract semantic expression has correct semantic information.

16. The method according to claim 9, further comprising:

when the abstract semantic expression corresponding to the initial request message cannot be obtained, prompting to manually add an extended question corresponding to the initial request message into the intelligent knowledge base.

17. The method according to claim 16, further comprising:

when the initial request message is stored into the intelligent knowledge base, providing an answer corresponding to the initial request message; and storing the answer along with the initial request message into the intelligent knowledge base.

18. A non-transitory computer-readable-medium storing instructions that, when executed, cause a computer to perform a method for constructing an intelligent knowledge base, comprising:

providing an abstract semantic database, wherein the abstract semantic database comprises a plurality of abstract semantic expressions and each of the plurality of abstract semantic expressions comprises a semantic-lacking element;

receiving, via an intelligent-knowledge-base constructing device, an initial request message, which needs an abstract semantic recommendation;

performing an abstract semantic recommending process on the initial request message based on the abstract semantic database;

obtaining, via the intelligent-knowledge-base constructing device, one or more abstract semantic expressions corresponding to the initial request message;

extracting, from the initial request message, an element corresponding to a semantic-lacking element of the one or more abstract semantic expressions;

filling the extracted element into the semantic-lacking element of the one or more abstract semantic expressions to obtain one or more specific semantic expressions corresponding to the initial request message;

storing the initial request message and the one or more specific semantic expressions into the intelligent knowledge base; and wherein the abstract semantic recommending process comprises:

performing a word segmentation process on the initial request message to obtain one or more single words;

performing a part-of-speech tagging process on each single word to obtain part-of-speech information of the each single word;

performing a wordclass determination process on each single word to obtain wordclass information of the each single word;

performing a searching process on the abstract semantic database to obtain an abstract semantic candidate set relevant to the initial request message, wherein the abstract semantic candidate set comprises several abstract semantic expressions; and deriving an abstract semantic expression corresponding to the initial request message by performing a matching process on the several abstract semantic expressions in the abstract semantic candidate set based on the part-of-speech information and the wordclass information.

* * * * *